United States Patent
Gigliotti et al.

(10) Patent No.: US 11,425,412 B1
(45) Date of Patent: Aug. 23, 2022

(54) MOTION CUES FOR VIDEO ENCODING

(71) Applicant: Amazon Technologies, Inc., Seattle, WA (US)

(72) Inventors: Samuel Scott Gigliotti, Seattle, WA (US); Brian Oliver, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/094,410

(22) Filed: Nov. 10, 2020

(51) Int. Cl.
 *H04N 19/159* (2014.01)
 *H04N 19/176* (2014.01)
 *H04N 19/182* (2014.01)
 *H04N 19/517* (2014.01)

(52) U.S. Cl.
 CPC ......... *H04N 19/517* (2014.11); *H04N 19/159* (2014.11); *H04N 19/176* (2014.11); *H04N 19/182* (2014.11)

(58) Field of Classification Search
 None
 See application file for complete search history.

(56) References Cited

U.S. PATENT DOCUMENTS

| | | | | |
|---|---|---|---|---|
| 8,908,775 B1* | 12/2014 | Higa | ............... | A63F 13/525 375/240.26 |
| 9,641,795 B2* | 5/2017 | Urban | ............... | H04N 19/115 |
| 9,741,129 B2* | 8/2017 | Holtz | ............... | H04N 5/23203 |
| 10,230,950 B2* | 3/2019 | Peng | ............... | H04N 19/124 |
| 10,274,737 B2* | 4/2019 | Smolyanskiy | ............... | H04N 13/344 |
| 2001/0036319 A1* | 11/2001 | Sakaida | ............... | H04N 19/23 382/232 |
| 2003/0058938 A1* | 3/2003 | Francois | ............... | H04N 19/503 375/240.08 |
| 2005/0024487 A1* | 2/2005 | Chen | ............... | H04N 19/186 348/14.13 |
| 2005/0084017 A1* | 4/2005 | Seo | ............... | H04N 19/176 348/700 |
| 2006/0005136 A1* | 1/2006 | Wallick | ............... | H04M 9/082 715/726 |
| 2006/0222072 A1* | 10/2006 | Ramakrishnan | ............... | H04N 19/61 375/E7.106 |
| 2009/0268816 A1* | 10/2009 | Pandit | ............... | H04N 19/436 375/240.12 |
| 2010/0251287 A1* | 9/2010 | Deshpande | ............... | G11B 27/28 725/32 |
| 2011/0249073 A1* | 10/2011 | Cranfill | ............... | G06F 3/0482 348/14.02 |

(Continued)

*Primary Examiner* — Mohammad J Rahman
(74) *Attorney, Agent, or Firm* — K&L Gates LLP

(57) ABSTRACT

Devices and techniques are generally described for encoding video data based on motion cues. In some examples, a first frame of image data representing a first view of a physical environment may be generated. The camera may be moved by a first amount in a first direction. A second frame of image data representing a second view of the physical environment may be generated. Intra-frame motion may be determined by subtracting a first vector representing movement of the camera by the first amount in the first direction from a second vector representing motion between the first frame and the second frame. Motion vector data representing motion between the first frame and the second frame may be calculated based on the intra-frame motion. An encoded representation of the second frame of image data may be generated and sent to a second device.

18 Claims, 9 Drawing Sheets

(56) References Cited

U.S. PATENT DOCUMENTS

| | | | | |
|---|---|---|---|---|
| 2013/0176487 | A1* | 7/2013 | Nakashima | G06T 7/41 |
| | | | | 348/452 |
| 2014/0092214 | A1 | 4/2014 | Ogawa | H04N 13/178 |
| | | | | 348/43 |
| 2014/0307097 | A1* | 10/2014 | Bigioi | H04N 5/23296 |
| | | | | 348/164 |
| 2014/0334548 | A1* | 11/2014 | Chen | H04N 19/89 |
| | | | | 375/240.16 |
| 2014/0369417 | A1* | 12/2014 | Shi | H04N 19/164 |
| | | | | 375/240.16 |
| 2015/0362520 | A1* | 12/2015 | Wells | G01C 21/16 |
| | | | | 702/141 |
| 2016/0035104 | A1* | 2/2016 | Bigioi | H04N 5/23254 |
| | | | | 348/208.1 |
| 2016/0080760 | A1* | 3/2016 | Nakaishi | H04N 19/57 |
| | | | | 375/240.16 |
| 2016/0205341 | A1* | 7/2016 | Hollander | H04N 7/015 |
| | | | | 375/240.08 |
| 2017/0272771 | A1* | 9/2017 | Edpalm | H04N 19/176 |
| 2018/0063482 | A1* | 3/2018 | Goesnar | H04N 5/2259 |
| 2018/0131950 | A1* | 5/2018 | Guo | H04N 19/25 |
| 2018/0330169 | A1* | 11/2018 | van Hoof | G08B 13/19613 |
| 2018/0349708 | A1* | 12/2018 | van Hoof | G08B 13/19656 |
| 2019/0335204 | A1* | 10/2019 | Lei | H04N 19/103 |
| 2020/0294246 | A1* | 9/2020 | Larson | G06T 7/246 |

* cited by examiner

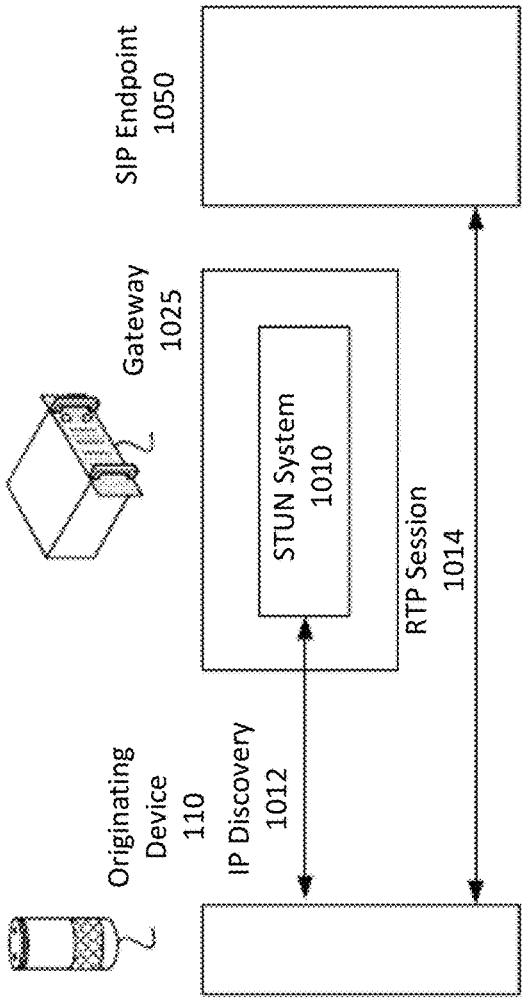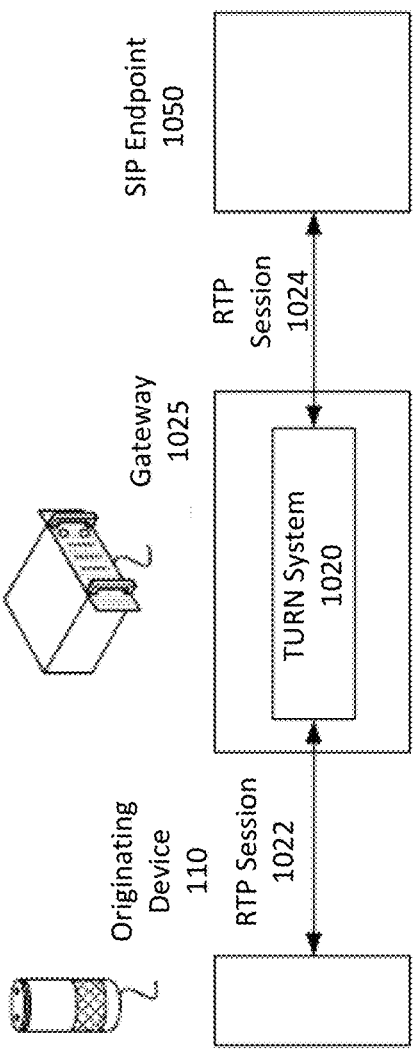

MOTION CUES FOR VIDEO ENCODING

BACKGROUND

Video and/or other media may be sent between computing devices over a network. In some examples, video may be encoded by a sender device and sent to a recipient computing device, decoded and played back while subsequent portions of the video are still being transmitted to the recipient computing device by the sender device. Such video transmission and playback is often referred to as "streaming". In some cases, video captured by a camera of a first device may be sent over a network to a second device, while video captured by a camera of the second device may be sent over the network to the first device during a real time communication session (e.g., a video call). Similarly, audio data may be sent between the first and second devices. In some other examples, software applications may be hosted by one or more computing devices and application data may be sent over a network to one or more recipient computing devices. Network conditions can change during data transmission over networks due to changes and/or increases in network traffic. For example, network conditions may sometimes deteriorate which may lead to delays in streaming of video and/or other media files.

BRIEF DESCRIPTION OF DRAWINGS

FIGS. 9A-9B illustrate examples of establishing media connections between devices according to embodiments of the present disclosure.

DETAILED DESCRIPTION

Figure 1:
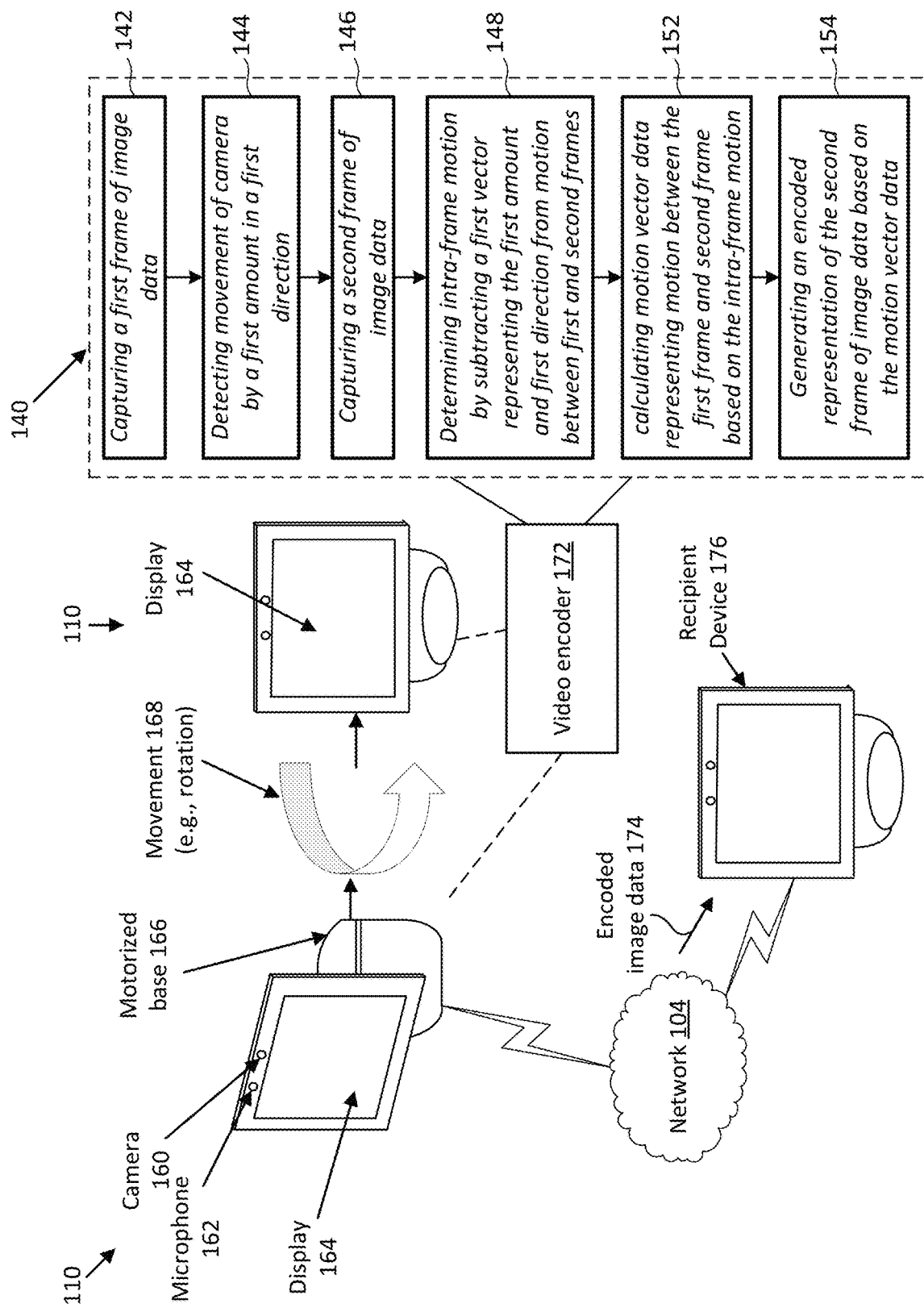
FIG. 1 is a diagram illustrating an example device that may be effective to encode video data based on device movement, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Provided herein are technical solutions to improve sending of image, video, and other types of data that may reduce encoding complexity, reduce network latency, reduce the amount of required bandwidth for video transmission, and/or improve video quality at a given bitrate. In various examples, computing devices are described comprising embedded camera systems and/or displays. In various examples, the camera system and/or the displays of some of the computing devices described herein may be motorized such that the camera system and/or display may be movable and may face different directions. For example, the device may rotate along one or more axes such that the field-of-view (FoV) of the camera system may capture images from different directions. In one example, the device may rotate horizontally (e.g., along an axis parallel to the floor) 360° such that images and/or video may be captured of any direction along the horizontal axis. In various other examples, the device may rotate along the vertical and horizontal axes such that the camera system has a spherical or partially spherical FoV.

In various examples, the computing devices may be effective to communicate (e.g., over a network such as the Internet and/or a local area network (LAN)) with one or more other devices. For example, the devices may communicate using a real time communication protocol such as WebRTC to enable video and/or image data to be sent from the devices to one or more other devices. Similarly, the devices may receive video and/or images from other devices and may display such video/images on a display of the devices.

In various examples, the devices may include one or more processors and/or non-transitory computer-readable memory. The non-transitory computer-readable memory may store instructions that enable the device to perform various functions including communication using WebRTC and/or other communication protocols. In some examples, the devices may be effective to engage in audio and/or video communication with other devices, sometimes referred to as "video chat" and/or "video calls." Additionally, the devices may engage in voice over IP and/or audio calls with one or more other devices (e.g., mobile phones and/or other computing devices).

A segment of video captured by the various devices described herein may be encoded as a series of image frames that may be rendered in sequence to create the effect of movement as frames are displayed sequentially in rapid succession. Accordingly, each frame of a video may comprise an ordered position within the sequence of the video. For example, header data of an image frame or other metadata associated with an image frame may identify a frame's ordered position within the sequence of the video. As used herein, "video data" may refer to a single frame of image data that may be rendered with one or more other frames of image data to create the impression of motion on a display, or to multiple frames of image data that may be rendered together or with one or more other frames of image data to create the impression of motion on a display. In various examples, frames of image data that comprise portions of a video may comprise indications of an order in which the frames should be decoded and/or rendered during playback. The term "image data", as used herein, may refer to pixel values, macroblock values such as coefficients, or other data used to represent an image or a portion of a video. Segments of video streams comprise frames of image data. In many examples, frames of image data may be displayed at a frame rate of greater than 20 frames per second. Each frame comprises columns and rows of pixels, with each pixel having a pixel value affecting how the pixel looks to the human eye when rendered on a display. In various examples, pixels of a frame of image data may be divided into a number of macroblocks to simplify image processing, such as encoding and decoding the frames. For example, a macroblock may represent a 4×4, 8×8, 16×16 or other grouping of pixel values. Accordingly, a frame may be divided into a number of macroblocks with each macroblock corresponding to a location within the frame.

Video data is often compressed for transmission and storage. For example, an encoder may encode the first frame of a video segment as a reference frame. Macroblocks of the reference frame may intra-encoded, indicating that the macroblock image data of the reference frame may be decoded without referencing any other frame. As such, the reference frame may be referred to as an "intra-frame" or an "I-frame". Macroblocks of subsequent video frames from the same video segment may be inter-encoded and may include references to the reference frame rather than fully intra-encoding each pixel and/or macroblock of the frame. Accordingly, inter-coded frames (e.g., P-frames and/or B-frames) may be smaller in size in terms of the amount of available memory needed to store such a frame. As such, video compression using inter-encoded macroblocks and/or frames may reduce latency in video streaming when network conditions deteriorate.

In various examples, motion vectors may be calculated for inter-coded macroblocks and/or inter-coded frames. Frames of image data may be compared by an encoder in order to calculate motion vectors for macroblocks of a frame being encoded. Motion vectors may be effective to define the content of a macroblock currently being encoded by reference to the contents of a known macroblock in a previous frame. Various examples of algorithms that may be used to calculate motion vectors based on comparison of a current frame with a previous frame include block-matching, phase correlation, frequency domain block matching, pixel recursive algorithms and/or optical flow algorithms. Although motion vectors may be used to increase the amount of compression of inter-coded frames, the calculation of motion vectors can be computationally expensive in terms of processing time, memory requirements, power consumption and/or access to processing units. As such, in some examples, the calculation of motion vectors may introduce latency in video transmission and playback.

In various examples, one or more processors of a device may control movement of the camera system. Image data captured by the camera system at a given point in time may be referred to as a frame of image data. A frame of image data may comprise a plurality of pixels arranged in a two-dimensional grid of columns and rows of pixels, as previously described. In at least some examples, the frame of image data captured by a camera system of a device may be of a wider FoV than the frame transmitted for viewing by another device.

In various examples described herein, data describing the camera system's movements may be used by a video encoder component to reduce the amount of motion information and/or image data information that is encoded to reduce bandwidth and/or to improve video quality for a given bandwidth. As an example, when a device comprising a camera system is moving (e.g., rotating), there may be both motion existing within the frame (e.g., a person walking across a room and thus appearing to walk across the frame) as well as motion caused by movement of the camera (e.g., rotation of the device comprising the camera system). The video encoder component interprets camera movement as all the pixel values being shifted in sequential captured images by an amount that corresponds to the amount of camera movement. Motion due to camera movement can be expensive to encode since the encoder operates on frame differences. In a scenario where the camera is moving, there may be a large number of pixel differences from one frame to the next. As described above, video encoders calculate motion vectors to compensate for such movement, whereby the decoder can shift pixel values (and/or macroblock values) based on the information in the motion vector. For example, a macroblock may be encoded as a skipped macroblock (e.g., no coded coefficients, no header information, and no prediction information for the macroblock) with a motion vector referencing a macroblock that is along the direction of the camera movement.

In various examples, an encoder may encode frames of video data (e.g., constituent frames of image data of a video) using one or more of an orthogonal image transform, a quantization process, and/or an entropy encoding process. Examples of orthogonal image transform may include frequency domain based image transforms such as, for example, a discrete cosine transform (DCT), a Fourier transform, a Hadamard transform, or another "lossy" or lossless image transform used to represent the image data in the frequency domain. In DCT, coefficients of different frequency cosine waves are calculated based on the contribution of the different frequency cosine waves to the portion of the image being encoded. After subjecting image data to a DCT, the lower frequency cosine wave coefficients are typically much larger relative to the higher frequency cosine wave coefficients. This is due to the higher frequency cosine waves typically having a less significant impact (i.e., the higher frequency cosine waves contribute less to the image or portion of the image) on the image being encoded and the lower frequency cosine waves having a more significant impact on the image being encoded. The coefficients of the different frequency cosine waves may be divided by quantization factors during the quantization process and rounded to the nearest integer, to further compress the data. In various examples, the quantization factors may be determined using a rate control algorithm. A rate control algorithm may solve an optimization problem to determine the number of bits that should be used to encode macroblocks of image data and/or a frame of image data at a given level of image quality and/or at a given level of distortion. In some other examples, a rate control algorithm may solve an optimization problem to determine a level of image quality at a given number of bits. Image quality may be determined using peak signal to noise ratio (PSNR) and/or structural similarity index (SSIM), for example.

After the quantization process, several zero value coefficients are typically present in the high frequency cosine wave range of the compressed image data. The list of quantized coefficients can be serialized using, for example, a "zig zag" scan of the array of quantized coefficients. The serialized list of quantized coefficients can be further compressed using an entropy encoding process, such as binary arithmetic encoding or Huffman encoding, to reduce the number of bits necessary to represent the compressed image data. In various examples, the quantization factors used during quantization process may be increased in order to further reduce the size of the compressed representation of image data resulting from encoding in terms of a number of bits needed to represent the image data.

In various examples, during a video call, the device may be effective to track a local participant in the video call as the person moves around a room in which the device is located. For example, the device may pan (using a motor of the device and/or by digitally panning within a captured frame of image data that has a larger size relative to an image that is displayed on the display) so that the displayed image and/or the FoV of the camera system remains (at least generically) centered around an engaged participant(s) in the video call. Additionally, the device may be effective to zoom in on the participant and/or zoom out to a wider-angle FoV. Various techniques described herein are configured to detect and prioritize objects (e.g., participants) during a video call and/or during other video-based communication (e.g., video games, etc.). Prioritized objects may be those persons, things, and/or animals that are selected at a given time for following (e.g., by controlling a motor of the device to maintain the object within the FoV of the camera and/or by using a Digital Pan, Tilt, Zoom (DPTZ) operation to frame the object within an output frame of image data generated from a wider-angle frame of image data captured by the camera). As described herein, various techniques may be used to reduce bandwidth of video encoded by the device and/or to improve the video quality of encoded video for a given bandwidth.

For example, motion vectors representing movement of the camera/device may be subtracted from vectors representing the total motion between two frames (or slices) prior to computing the motion vectors for the frames of the video. The motion vectors representing movement of the device may be known prior to computation of motion vectors of the video since the movement of the device is controlled by control signals generated by at least one processor of the device. Subtracting the motion vector representing the camera's movement from the total motion and then computing the motion vectors of the video results in only the inherent motion within the frames of the video being represented by the motion vectors. The motion due to movement of the device/camera may thereafter be added by shifting pixels/macroblocks and encoding macroblocks as skipped blocks, where appropriate. The motion vectors and/or skip block information may be used to encode frames of the video for transmission by the video encoder and/or may be sent as part of the bitstream (and/or via a separate communication channel) to the decoder of the recipient device which may then perform the appropriate pixel/macroblock shifts.

In some other examples, a background image (e.g., a wide angle frame of image data) may be captured that is wider than the FoV displayed by the recipient device. The background image may be saved as a reference frame and may be sent to and saved by the decoder device. Thereafter, segmentation may be used on the encoder side to separate foreground image data (e.g., a person talking during a video call) from the saved background image. In various examples, the foreground image data may be transmitted (without the background) to the recipient device. The decoder of the recipient device may be effective to overlay the received foreground image data on top of the previously-saved background image data and may display the overlaid foreground image data on top of the saved background image data. The saved background image data may be captured and stored periodically to reflect changes to the background of the scene. The saved background image data may be stored locally on the recipient device (e.g., a user device participating in a video call) in order to improve video quality and/or reduce the video bandwidth. The background image data may not be stored by any cloud based and/or intermittent services in order to preserve user privacy. In some examples, a frequency with which background image data may be sent to the decoder device and/or saved by the decoder device may be proportional to the amount of camera/device movement. For example, if the device is rotating often the background image data may be saved and/or sent to the recipient device more frequently relative to times when the camera is not moving for a long period and/or is relatively still. The amount of camera/device movement can be related to any type of movement. For example, the amount of camera/device movement may be due to translation of the camera/device, rotation of the camera/device, tilt of the camera/device, and/or other movement of the camera/device within a three-dimensional space (e.g., such as where the camera is attached to a moving vehicle). The amount of camera/device movement may be expressed in terms of rotation (e.g., degrees or radians), in terms of a displacement in physical space, etc., depending on the type of movement.

In various examples, the background image may comprise a wider FoV relative to what is displayed by the recipient device. When the camera pans and/or moves (e.g., due to movement and/or rotation of the device) it may not be necessary to encode and/or send background image data so long as the newly-captured image data on the edges of the frame (resulting from panning/movement of the camera/device) was previously represented in a previously-saved background frame of image data.

In various examples, the size (in terms of frame width and/or height) of the frames of background image data being generated may be dynamically determined based on the motion of the device. For example, a correspondence may be determined between an amount of movement of the device (e.g., device 110) and a number of macroblocks and/or pixels by which the frames of image data captured by the camera will be shifted. In an example, if a processor indicates that the camera is rotating to the right at a rate of 20 macroblocks/second (or some other appropriate rate), the frame width may be increased and/or panned toward the right side of the background frame to accommodate the current camera motion. In various examples, one or more processors of device 110 may be effective to determine a correlation between movement 168 and a number of macroblocks and/or pixels shifted in the scene as a result of the movement 168. For example, a first macroblock may be identified in a first frame of image data. After movement 168, a block-matching algorithm may be used to determine a second macroblock in a second frame of image data that corresponds to the first macroblock in the first frame. Thereafter, a shift in the number of macroblocks may be determined (between the first macroblock and the second macroblock). The shift may be expressed, for example, as a vector (e.g., a displacement in the x and y dimensions between the first and second macroblock). Thereafter, the movement 168 of the motorized base 166 may be correlated with the shift of macroblocks. In various examples, such a determination may be made during device 110 calibration. Accordingly, during normal operation, the movement 168 may be associated with a shift in terms of the number of macroblocks (and/or pixels) without requiring a block-matching algorithm to be executed. Instead, a simple lookup and/or vector calculation may be performed to determine a shift in macroblocks based on the amount and direction of movement 168.

FIG. 1 is a diagram illustrating an example device 110 that may be effective to encode video data based on movement of device 110, in accordance with various aspects of the present disclosure. As shown, the device may include at least one display 164, at least one camera 160, at least one microphone 162, and a motorized base 166. In the example depicted in FIG. 1, the motorized base 166 may be configured to rotate 360°, 270°, and/or any other desired amount of rotation along a single axis. However, in various other implementations the device may rotate by any desired amount along any number of axes. As described herein, the motorized base 166 may be effective to move the device 110 so that a person interacting with the device 110 (e.g., during a video call) may be able to see the display 164 and so that the person remains in the FoV of the camera 160. This may allow improved video call experiences, as the user need not remain stationary during the video call. In various examples, the display portion of the device 110 (which may also include the at least camera 160 in some examples) may be manually positioned by a user in addition to be controlled by one or more internal motors for device-controlled movement.

In various examples, the device 110 may be controllable using a voice interface (e.g., a natural language processing system 120). In some examples, natural language processing (e.g., speech processing and/or text processing) may occur wholly or partially on device 110. In some other examples, natural language processing may be performed by a natural language processing system 120 that may be configured in communication with device 110 over a network 104 (e.g., a local area network (LAN) and/or wide area network (WAN), such as the Internet). Various natural language processing architectures are described below in reference to FIGS. 2 and 8.

In various examples, users of device 110 may issue spoken commands such as "Follow me," "Zoom in on my face," etc., during video calls in order to control the behavior of the device. Additionally, voice commands may be used to initiate and/or end video calls (and/or audio calls) and may be used to perform other functionality associated with the device 110 (e.g., video playback, audio playback, Internet browser control, application control, etc.). In various examples, the device 110 may be effective to determine that a user is interacting with the device and use the motor of the device 110 to face the device's display 164 toward the user. For example, a user may say a wakeword configured to initiate communication with a voice interface of the device 110. The device 110 may use various techniques (e.g., beamforming) to determine a direction from which the wakeword was received and may rotate the display 164 and/or camera 160 to face that direction. In various other examples, a user may initiate a video call with the device 110.

In some examples, the device 110 may use a combination of computer vision techniques and/or audio processing techniques to determine the presence, location, and/or level of engagement of individuals interacting with the device. In various examples, all processing to determine the presence and/or location of individuals interacting with the device 110 may be performed locally on the device 110 to avoid sending potentially sensitive data to any remote devices. In various examples, the camera 160 of the device 110 may be controlled to digitally pan and/or zoom to frame individuals interacting with the device 110 to keep such individuals visible within the FoV and/or centered within the image frames generated by the device and sent to remote "callee" devices during a video call.

Device 110 may execute one or more video encoders, such as video encoder 172, to encode and send image data to one or more recipient devices. For example, image data and/or video data captured by camera 160 may be encoded by video encoder 172 and sent to a recipient device. As described herein, various techniques may be used to reduce the bandwidth needed to encode video (and/or to improve video quality at a given bandwidth) based on movement 168 of device 110.

An example process 140 for encoding video data based on device movement is depicted in FIG. 1. Process 140 may be executed by at least one processor of device 110. For example, at least one processor of device 110 may execute instructions stored in non-transitory computer-readable memory that are effective to execute video encoder 172 to perform one or more of the various techniques described herein.

Process 140 may begin at action 142, at which a first frame of image data may be captured by camera 160. The first frame of image data may be a part of a video (e.g., a video call) being captured, encoded, and sent to a recipient device for display. The device 110 and camera 160 may be disposed in a first position at the time at which the first frame of image data is captured.

Process 140 may continue to action 144, at which movement 168 of camera 160 by a first amount in a first direction may be detected. For example, the device 110 (and camera 160) may rotate to follow a participant in the video call. At least one processor of the device 110 may control the movement of the device (e.g., via motorized base 166) and may thus detect data representing movement 168 including a rate, direction, and/or amount of movement.

Processing may continue at action 146, at which camera 160 may capture a second frame of image data. In the example, the second frame of image data may be captured after (or during) movement 168 of the device 110. Accordingly, the FoV of the camera 160 may be different when capturing the first frame relative to the second frame. Additionally, the at least one processor and/or video encoder 172 may determine an amount of motion between the first frame and the second frame. For example, a sum of absolute differences (SAD) technique and/or other known motion detection technique may be used to determine the total amount of motion between the first frame and the second frame. Some of the motion may be due to movement of the camera 160. For example, if the camera 160 rotates along a horizontal axis from left to right, objects within the FoV of camera 160 may appear to move from right to left due to the changing perspective of the FoV of camera 160. Additionally, some objects (e.g., a person walking and/or moving their hands and/or face) may be moving between the first frame and the second frame. Accordingly, in addition to movement related to movement of camera 160, there may be intra-frame motion between the two frames. Intra-frame motion, in this context, refers to motion of objects that are actually moving within the environment, as opposed to objects that appear to be moving due to the movement 168 of camera 160.

Processing may continue at action 148 at which intra-frame motion may be determined by subtracting a first vector representing the first amount and first direction from motion between first and second frames. For example, a total motion vector may be calculated (e.g., using block-matching, phase correlation, etc.) that represents total motion between the first frame and second frame. Thereafter, a first vector representing the movement 168 (e.g., a movement by a first amount in a first direction) may be subtracted from the total motion vector prior to calculation of motion vectors by video encoder 172. The resultant vector may represent only the intra-frame motion with the motion due to movement 168 being subtracted. In some examples, instructions may be sent to cause a decoder device to shift pixels/macroblocks of the output frame by an amount corresponding to the movement 168 prior to displaying the output image.

Processing may continue to action 152, at which motion vector data representing motion between the first frame and second frame may be calculated based on the intra-frame motion. In various examples, motion vectors may be calculated for inter-coded macroblocks and/or inter-coded frames. Frames of image data may be compared by video encoder 172 in order to calculate motion vectors for macroblocks (or pixels) of a frame being encoded. Motion vectors may be effective to define the content of a macroblock currently being encoded by reference to the contents of a known macroblock in a previous frame (e.g., the first frame captured at action 142). Various examples of algorithms that may be used to calculate motion vectors based on comparison of a current frame with a previous frame include block-matching, phase correlation, frequency domain block matching, pixel recursive algorithms and/or optical flow algorithms. Although motion vectors may be used to increase the amount of compression of inter-coded frames, the calculation of motion vectors can be computationally expensive in terms of processing time, memory requirements, power consumption and/or access to processing units. Accordingly, limiting motion vector calculation to only intra-frame motion (e.g., inherent motion) as opposed to the motion resulting from movement 168 may conserve bandwidth (and/or may be used to improve the quality of the image data at a given bandwidth).

Processing may continue to action 154, at which an encoded representation of the second frame of image data (e.g., encoded image data 174) may be generated. This encoded representation may be based on (and/or may include) the motion vectors calculated at action 152 representing the intra-frame motion. Additionally, the encoded representation may include instructions, commands, and/or other executable data configured to cause a decoder to shift pixels and/or macroblocks of the image data by an amount corresponding to the movement 168 (in order to add back in the motion due to the movement 168 of camera 160). However, such macroblocks and/or pixels may simply be shifted (e.g., encoded as skip blocks with zero residuals), which consumes relatively little bandwidth. The encoded representation of the second frame of image data (e.g., encoded image data 174) may be sent to recipient device 176. A decoder of recipient device 176 may be effective to decode the image data (e.g., using the motion vector data calculated at action 152 and/or one or more reference frames (e.g., I-frames)) and may display the image data as part of a video communication session (e.g., a video call).

In various examples, object detectors are machine learning models that locate and/or classify objects detected in frames of image data. Typically, the output of an object detector model is a "region of interest" identifying a group of pixels and a label classifying that region of interest as belonging to a particular class for which the object detector has been trained. Bounding boxes (e.g., data indicating a perimeter surrounding a detected object within a frame of image data) are one example of a region of interest. For example, an object detector may be trained to classify dogs and cats. Accordingly, if an input image includes first pixels representing a dog and second pixels representing a cat, the object detector may output two regions of interest (e.g., output bounding box data). The first region of interest may surround the first pixels and may be labeled as "dog." Similarly, the second region of interest may surround the second pixels and may be labeled as "cat." Regions of interest may be defined using any shape. However, bounding boxes are typically rectangular and may be defined by the four pixels addresses that correspond to the corners of the bounding box. In some examples, regions of interest are defined by a perimeter of pixels surrounding pixels predicted to correspond to some object (e.g., a person, animal, thing, etc.) which the object detector has been trained to detect. In some other examples, pixel-wise and/or block-wise segmentation may be used to identify regions of interest. In various examples, the device 110 may include one or more object detectors that are effective to detect and/or classify various different objects (e.g., humans, cats, dogs, faces, etc.). For example, computer vision techniques may be used to perform segmentation that separates images into different classes of objects. For example, segmentation data (e.g., a segmentation mask) may be generated that separates pixels and/or macroblocks representing foreground objects from background objects. For example, a person interacting with the device 110 may be determined to be a foreground object, while the background of the environment (e.g., the room in which the person is located) may be denoted as background image data. Segmentation techniques may be used to separate image data representing different classes of objects from one another. For example, portions of a frame of image data labeled as "foreground image data" (post segmentation) may be separated from the portions of image data labeled as "background image data." Thereafter, the foreground image data (and/or the background image data) may be stored in memory and/or sent to a recipient device.

In some examples, dedicated artificial intelligence hardware may be used to perform computer vision tasks, such as object detection and/or image segmentation. For example, the neural network accelerator architecture described below in reference to FIG. 7 may be used to perform computer vision tasks, audio processing tasks, and/or other machine learning tasks in order to detect objects in image data and/or audio data, and/or to determine object priority for following such objects during video communication.

For example, an object detector may be effective to recognize an object (e.g., a person, thing, or animal) and/or to distinguish between different objects using face recognition algorithms. In some examples, the machine learning models used to implement object detectors and/or image segmentation algorithms may be executed locally on the device 110, while in other examples, the machine learning models may be executed by a back-end system (e.g., a remote computing device) with which the local devices may communicate over network 104.

Automatic speech recognition (ASR), as described herein, is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language. In many examples, the natural language input data (e.g., a user utterance and/or input text) may result in specific semantic intent data representing a semantic interpretation of the text. In some examples, the semantic intent data is actionable to cause the natural language processing system and/or a natural language processing application (referred to herein as a "skill") to perform an action. Generally, semantic intent data may represent a goal of a user in making the particular utterance. In some examples, the semantic intent data may include executable commands or other type of instructions that may be used to take some action related to the speech processing system's understanding of the user's request. Thereafter one or more of the semantic intents may be selected for further processing and/or output by the NLU system. For example, the semantic intent associated with the highest confidence score among the different semantic intents generated may be selected for further processing and/or output.

Text-to-speech (TTS) is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a natural language processing system ("input data") may be described by "natural language inputs" and/or simply "inputs." Such request data may change forms many times during processing of the request data by various components of the speech processing system. For example, initially the input data may be audio data and/or input text data representing a user question. The audio data may be transformed into text data and/or other ASR output data by an ASR component of the speech processing system. The text data and/or other ASR output data may be transformed into intent data by an NLU component of the speech processing system.

Intent data may be used by a skill to perform an action (e.g., to generate action data and/or other skill output that may be processed in order to take some corresponding action such as answering a user's question, playing video, playing audio, etc.). In various examples described herein, a user may request that the device 110 follow the user (e.g., using the spoken request "Focus on me," "Camera focus on me," "Computer, zoom on me," etc.). In some further examples, a voice command (or other natural language input) may be used to initiate a video communication session (e.g., a video call, video game with live video, etc.). NLU processing may be used to determine that the user wants the camera of the device to follow the user during a communication session (e.g., a video call). Accordingly, device 110 may prioritize a user and may control camera 160 and/or motorized base 166 to follow the user during the communication session.

Natural language inputs may refer to any data related to an input request to a speech processing system (e.g., including the various data forms described above, as each of the aforementioned data types relate to an input request to the speech processing system). In general, as used herein, skills may be any software (and/or combination of software and hardware) used during speech processing to take an action in response to input request data (e.g., natural language inputs such as user utterances and/or text).

In various examples, speech processing systems may determine an intent for particular natural language input according to an interpretation of the natural language input determined by NLU. In various examples, multiple NLU process flows may be executed for a given natural language input, as some process flows may be more effective in deriving semantic meaning from particular types of utterances and/or other natural language inputs. For example, a primary NLU process flow may comprise a rule-based heuristic system utilizing knowledge graphs and/or ontological configurations that have been coded in advance. The primary NLU process flow may use a process known as named entity recognition (NER) to identify entites (e.g., nouns and/or pronouns) in a given natural language input. The entites and/or other semantic language data of a natural language input may be parsed and sent to the knowledge graph, which, in turn, may be used to relate different objects and/or attributes of those entites (data describing characteristics of the entites) to one another.

In various examples, NLU systems and/or components described herein may be multi-modal as the NLU systems may be effective to process other types of inputs besides input natural language data (e.g., text and/or speech). For example, multi-modal NLU systems may be effective to process image data and/or video data to determine visual feature data that semantically represents objects included in the image data. As described in further detail below, multi-modal transformer models may be machine learned models that are effective to take both natural language data and image data as inputs in order to perform some task. In various examples described herein, multi-modal NLU systems may be effective to determine one or more objects in image/video data that are referred to in a natural language input. For example, if a user says, "Computer, focus on me," multi-modal NLU may determine that "me" refers to the individual who is speaking (e.g., whose mouth is moving) in the video captured by camera 160. In various examples, multi-modal NLU systems may be effective to take other inputs besides natural language data and image data. For example, NLU systems may be effective to receive movement data (e.g., accelerometer data, gyroscope data, haptic data, telemetry data, depth sensor data, etc.) and may determine intent data and/or select objects in image data based on such data.

In various examples, the device 110 may be effective to use Digital Pan, Tilt, Zoom (DPTZ), and/or rotation to follow and frame individuals located near the device so that the display and/or camera system of the device follow the individuals. As previously described, such operations may be performed by physically moving the camera (e.g., using one or more motors of the device such as the motorized base 166 and/or a motor of the camera 160) and/or by selecting portions of a captured frame of image data. For example, a frame of image data captured by camera 160 may be a wide angle frame which may depict (when rendered on a display) a person standing near the right side of the frame. If the person is being followed by the camera 160 and/or the device 110, a new frame of image data may be generated that excludes some of the left-hand portion of the wide angle frame captured by the camera so that the person is more centered within the new frame. Additionally, the display 164 may be rotated by motorized base 166 to face toward a person(s) being followed. This may make it easier for the person(s) to see the display and/or interact with the camera system of the device.

This disclosure describes a device 110 with improved visual, display, and audio characteristics. In some instances, the device 110 may include a display 164 that presents content. The display 164 may be hingedly coupled to a housing of the device 110 to tilt at varying degrees. Additionally, the device 110 may include a motor residing within the housing (e.g., motorized base 166) which may be effective to rotate the display 164. One or more loudspeakers (not shown in FIG. 1) may reside within the housing and may be arranged to output sound in different directions relative to the device 110.

In some instances, the device 110 may include separate sub-assemblies that when assembled, form the device 110. For example, the device 110 may include a display sub assembly and a housing sub assembly. The display sub assembly and the housing sub assembly may operably couple to one another via a hinge or other member cable of being pivoted to tilt the display at varying degrees. In some instances, the hinge may be moveable over a range of positions, such as between zero and 40° of tilt. In some instances, a user may grasp the display to tilt the display at varying degrees. Additionally, or alternatively, one or more actuators may tilt the display at varying degrees.

The display sub assembly may include the display 164, a camera 160 (or imaging device), microphones 162, and one or more buttons. The display 164 may present content to the user, and in some instances, may be touch sensitive and capable sensing touch input from the user. The camera 160 may capture images or video within an environment in which the device 110 resides. In some instances, a camera shutter may be slid over the camera, or otherwise obstruct the camera, from capturing images and/or videos of the environment.

The microphones 162, meanwhile, may capture user speech, user commands, and so forth. In some instances, the microphones 162 may be oriented in patterns and corresponding audio signals generated by the microphones may be used to determine a direction of speech input. For example, beamforming, time of arrival (ToA), triangulation, and/or other techniques may be used to determine the direction of speech input. In various examples, upon determining that a wakeword (e.g., "Alexa") has been detected from a particular direction, the motor of the device 110 may be used to rotate the display of the device 110 such that the display faces the direction from which the wakeword was received.

In various examples and as described in further detail below, various devices 110 may include hardware effective to perform audio processing (e.g., beamforming), computer vision processing (e.g., using convolutional neural networks and/or other machine learned models), execute machine learned models, and/or perform object selection priority processing, in accordance with various aspects of the present disclosure. For example, a neural network accelerator architecture may be used to execute various machine learning processes (including computer vision processes) so that such processes may be performed with low latency on-device, without sending data to one or more remote computing devices. An example neural network accelerator architecture is described below in reference to FIG. 7.

The one or more buttons may control an operation of the device 110. The buttons may be located at the top of the device 110, such as on a top of the display 164, and may correspond to a power button, volume buttons, sync buttons, or any other type of button or control. The buttons may be mechanical (e.g., having physically movable components) and/or electronic (e.g., capacitive sensors, optical sensors, resistive sensors, or the like).

The housing sub assembly may include a housing, one or more loudspeakers, a motor, hardware that carries out an operation of the device 110 (e.g., printed circuit boards (PCBs), processor(s), controllers, power module(s), etc.), and a base. In some instances, the housing may include a cylindrically shaped housing and may provide a platform to which components of the device 110 couple, or within which components reside. For example, the one or more loudspeakers may couple to and/or be disposed within the housing. In some instances, the device 110 may include three loudspeakers. A first loudspeaker may be arranged to emit sound towards a top of the housing (or the device 110) and may include a subwoofer loudspeaker. A second loudspeaker and a third loudspeaker may be oriented to radially emit sound away from the device 110 and may include tweeter loudspeakers.

In some instances, the first loudspeaker may be offset from a central longitudinal axis of the device 110 to counterbalance a weight of the display 164. That is, the loudspeaker may be disposed closer to a back of the device 110 to counteract a weight of the display 164, which may be disposed on a front of the device 110. Moreover, the second loudspeaker and/or the third loudspeaker may be oriented downward towards a surface on which the device 110 rests, and/or oriented outward, away from the display 164. The downward and/or outward orientation of the second loudspeaker and/or the third loudspeaker may limit or prevent sound being projected into a back or rear surface of the display 164. In some instances, the placement of the loudspeakers on or about the device 110, as well as their respective type, may provide a stereo or surround-sound effect when audio is output from the loudspeakers.

The motor may provide the housing (e.g., motorized base 166), the display 164, or other portions of the device 110 with rotational movement. In some instances, the motor may include a brushless direct current (DC) motor having a rotating body and a stationary body. The housing may couple to the rotating body such that when the motor is powered the housing rotates with the rotating body. However, the base may couple to the stationary body and remain stationary as the housing rotates. This permits the base to remain secure on a surface on which the device 110 resides.

As the housing rotates the display 164 may also rotate as well. That is, the coupling of the display 164 to the housing causes the display 164 to rotate with a movement of the housing. In some instances, the motor may be configured to rotate substantially 360° or substantially 180° in both clockwise and counterclockwise directions. In some instances, the motor may be configured to rotate 352° and in such instances, the motor may rotate 176° to either side of a reference point.

In some instances, as the device 110 may have a limited degree of rotational movement and may not be configured to rotate 360°, the device 110 may include a sensor that senses a position of the motor. The sensor may include an optical sensor that measures an angular displacement or position of the motor relative to a stationary portion of the device 110, such as the stationary body. An optical index, for example, may mount to the stationary portion of the motor and the sensor may mount to the rotating body of the motor. As the motor rotates, the sensor may image the optical index to determine position. The position of the motor may be used to indicate a remaining degree of rotation in clockwise and/or counterclockwise directions. The sensor may send signals representing the current position, a rate of movement, a displacement between two positions, etc., to a movement translation component 297 (FIG. 2) executed by device 110. The movement translation component 297 may be part of the video encoder 172 and/or may communicate with the video encoder 172 to determine a shift (in terms of a number of pixels and/or macroblocks) between two frames of image data captured by camera 160 resulting from movement 168 of device 110. The movement translation component 297 may determine the shift by finding matching pixel values and/or macroblock values in the two frames of image data and by determining the shift (in the two dimensional coordinate space of the grids of pixels/macroblocks) between the two frames.

The motor may also include a passageway, or channel, extending through the motor to provide a space in which wires may route. For example, the base may include a power PCB that receives power from a wall outlet or plug in and which couple to one or more PCBs within the housing. As the housing is located on an opposing side of the motor (or coupled to the rotating body of the housing) the wires may be wrapped or configured to resist torsional or rotational movement. For example, the wires may include helical wires, the wires may include clocksprings, and/or the wires may be overmolded for increased strength.

In some instances, the device 110 may be configured to track the user as the user moves throughout the environment or relative to the device 110. For example, as the user moves about the environment, the motor may rotate the housing such that the display 164, microphones 162, camera 160, and the loudspeakers are oriented or centered on the user. In some instances, the audio captured by the microphones 162 may be analyzed to determine the direction of the user, and correspondingly, such direction may be utilized to move the housing. Additionally, or alternatively, the camera 160 may capture images and the image data may be analyzed to determine the location of the user. As such, as the user moved above the environment, the housing and the display 164 may rotate to present content on the display for the user and/or provide the user with improved audio characteristics.

In some instances, a chassis or grill may surround at least a portion of the housing, such as sides of the housing. The grill may conceal components of the device 110, such as the one or more loudspeakers, the motor, wires, PCBs, and so forth. Additionally, a top cover may be disposed over the first loudspeaker and couple to a top of the housing. The grill and the top cover may provide the device 110 with a smooth and aesthetic appearance. The grill and/or the top cover, in some instances, may include a fabric material to allow sound generated by the loudspeakers to pass therethrough. Additionally, in some instances, the grill and/or the top cover may be interchangeable to give the device 110 varying appearances.

Introduced above, the device 110 may be configured to support speech interactions with one or more users and respond to user requests. For instance, a user may verbally request the device 110 to perform a particular task, such as to play music. The one or more microphones 162 may capture sound associated with the user speech. In some examples, the user may indicate a request by prefacing the request with a predefined keyword, such as a wake word or trigger expression. The device 110 may capture user speech and may process the user speech to identify a command. Speech processing, such as automatic speech recognition (ASR), natural language understanding (NLU), and speech synthesis may also be performed. However, in some instances, one or more remotely coupled computing device may perform the speech processing and transmit a response (or data) back to the device 110. Upon identifying the command, the device 110 may output a response, cause actions to be performed (e.g., playing music or ordering movie tickets), or elicit feedback from the user. In some instances, content identified in this manner may be played through the display and/or the loudspeakers of the device 110. However, the device 110 may also be configured to provide the content to peripheral devices such as Bluetooth loudspeakers or other peripherals that are nearby or in wired or wireless communication with the device 110. For example, in some instances, the device 110 may be configured to play music using a home audio system.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Storage and/or use of data related to a particular person or device (e.g., contextual data, video data, audio data, and/or any personal data) may be controlled by a user using privacy controls associated with the device 110 and/or a companion application associated with the device 110. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein. Further, as previously described, various computer vision, speech processing, and/or audio processing techniques described herein may be performed locally on device 110. Advantageously, performing such processing on-device instead of sending data to a remote system for processing may be effective to retain data on the device and may help to maintain user privacy.

Figure 2:
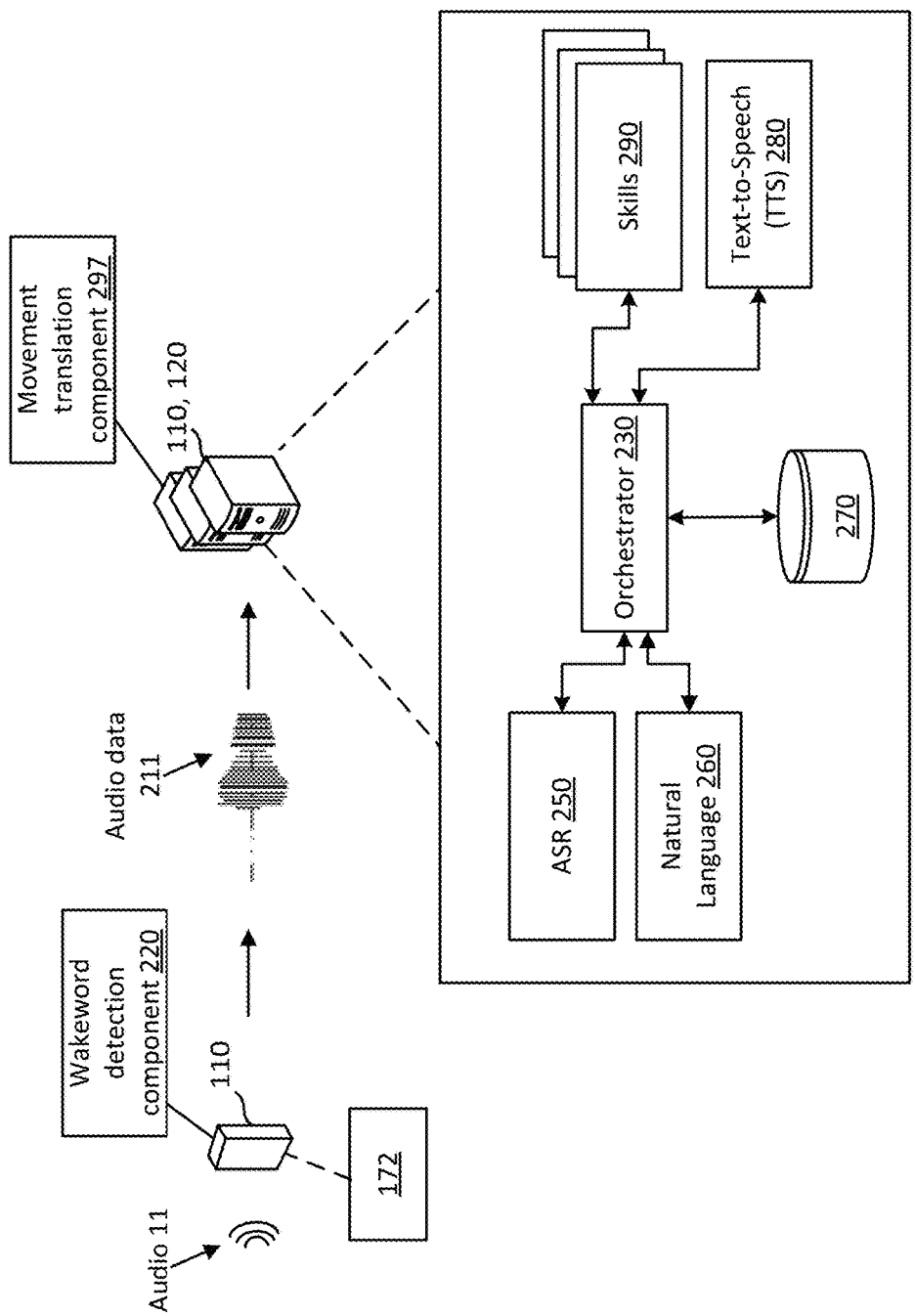
FIG. 2 is a block diagram of various components of a natural language processing system that may be used in accordance with various aspects of the present disclosure.

FIG. 2 is a block diagram of various components of a natural language processing system that may be used in accordance with various aspects of the present disclosure. Although not necessarily limited to such, the system may operate using various natural language processing components as described in FIG. 2. The various components may be located on same or different physical devices. Communication between various components may occur directly or across a network(s) 104.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data. The various components illustrated in FIG. 2 may be included in device 110, a separate natural language processing system 120, and/or some combination thereof.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 120 and/or may be provided by the user.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN)/transformer model structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may wake and begin transmitting audio data 211, representing the audio 11, to the natural language processing system 120. The audio data 211 may include data corresponding to the wakeword, or the portion of the audio data 211 corresponding to the wakeword may be removed by the device 110 prior to sending the audio data 211 to the natural language processing system 120.

Upon receipt by the natural language processing system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 110, the natural language processing system 120, the gateway system 1025, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 120 that is akin to a software application running on a traditional computing device. That is, a skill component 290 may enable the natural language processing system 120 to execute specific functionality in order to perform one or more actions (e.g., provide information to a user, display content to a user, output music, or perform some other requested action). The natural language processing system 120 may be configured with more than one skill component 290. For example, a weather skill component may enable the natural language processing system 120 to provide weather information, a ride sharing skill component may enable the natural language processing system 120 to schedule a trip with respect to a ride sharing service, a restaurant skill component may enable the natural language processing system 120 to order food with respect to a restaurant's online ordering system, a communications skill component may enable the system to perform messaging or multi-endpoint communications, etc. A skill component 290 may operate in conjunction between the natural language processing system 120 and other devices such as the device 110 or a gateway system 1025 in order to complete certain functions. Inputs to a skill component 290 may come from various interactions and input sources. A skill component may include a communications skill 290a which may correspond to a service for performing media processing that may be operated, for example, by a media processing unit (MPU) or other processor, as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 120 (as illustrated in FIG. 2) or may be located at whole (or in part) with one or more separate systems. Unless expressly stated otherwise, reference to a skill, skill device, or skill component may include a skill component operating within the natural language processing system 120 (for example as skill component 290) and/or skill component operating within a system separate from the natural language processing system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. A skill may also be associated with media operations that may be performed by an processor (e.g., a microprocessor unit (MPU)). This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented. In various examples, movement translation component 297 may be implemented as a skill component 290. However, in various other examples, movement translation component 297 may be implemented as other software executing on device 110. For example, movement translation component 297 may be executed as part of, or in communication with, video encoder 172. Movement translation component 297 may receive a signal indicating movement data from at least one processor of device 110 indicating an amount of movement, a direction of movement, and/or a rate of movement of device 110. Movement translation component 297 may determine a shift in pixels and/or macroblocks based on the movement data received from the at least one processor and may communicate the shift to video encoder 172.

The natural language processing system 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 120 may include profile storage 270 and/or the gateway system 1025 may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 120 may be executed wholly or partially by device 110.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 110, or other devices discussed herein.

The natural language processing system 120 may include a user recognition component that recognizes one or more users associated with data input to the system. The user recognition component may take as input the audio data 211 and/or text data output by the ASR component 250. The user recognition component determines scores indicating whether user input originated from a particular user. For example, a first score may indicate a likelihood that the user input originated from a first user, a second score may indicate a likelihood that the user input originated from a second user, etc. The user recognition component also determines an overall confidence regarding the accuracy of user recognition operations. The user recognition component may perform user recognition by comparing audio characteristics in the audio data 211 to stored audio characteristics of users. The user recognition component may also perform user recognition by comparing biometric data (e.g., fingerprint data, iris data, etc.), received by the system in correlation with the present user input, to stored biometric data of users. The user recognition component may further perform user recognition by comparing image data (e.g., including a representation of at least a feature of a user), received by the system in correlation with the present user input, with stored image data including representations of features of different users. The user recognition component may perform additional user recognition processes, including those known in the art. Output of the user recognition component may include a single user identifier corresponding to the most likely user that originated the present user input. Alternatively, output of the user recognition component may include an N-best list of user identifiers with respective scores indicating likelihoods of respective users originating the present user input. The output of the user recognition component may be used to inform NLU processing as well as processing performed by other components of the system.

Figure 3:
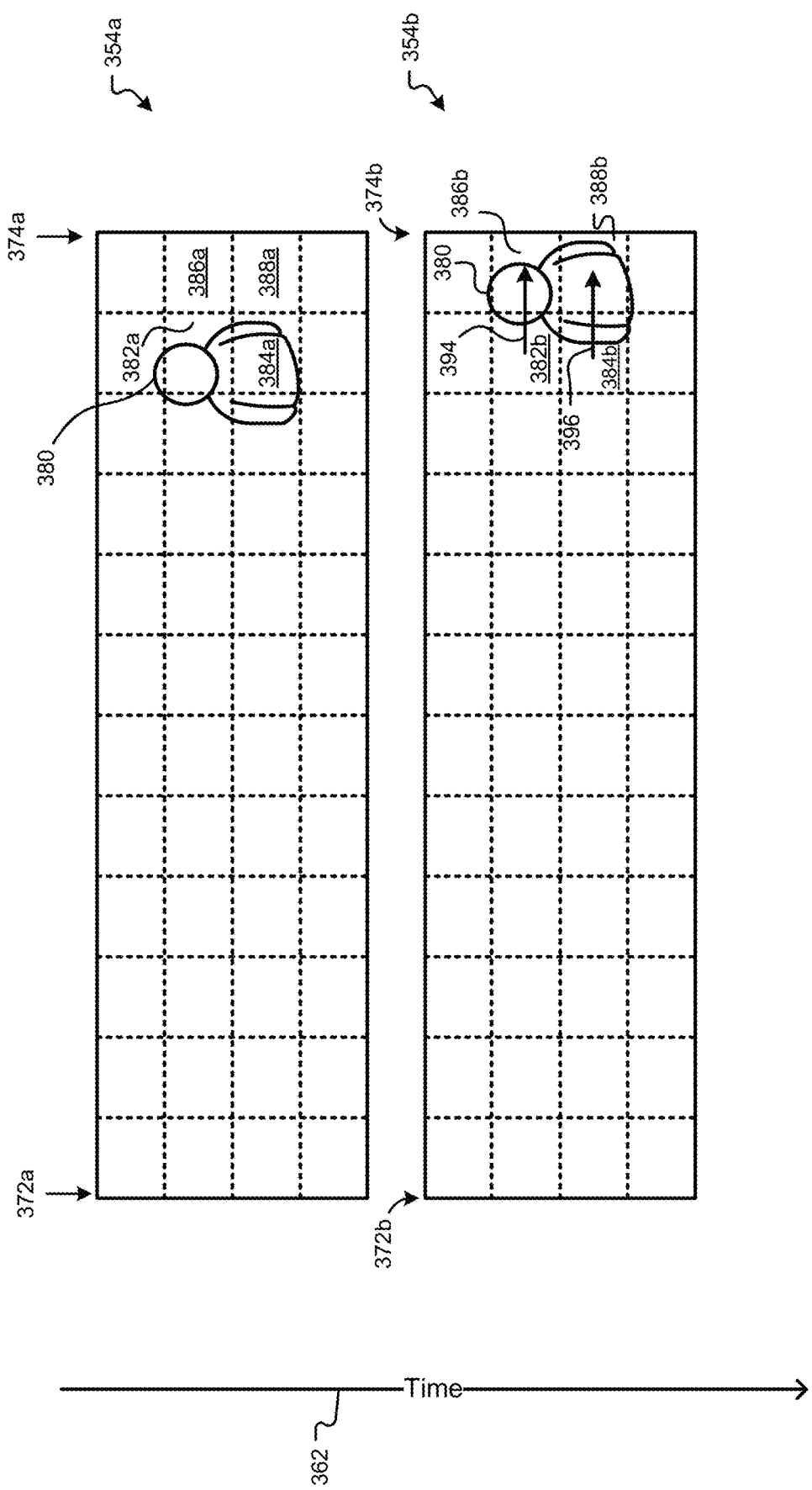
FIG. 3 is an example of video encoding based on device movement, in accordance with various aspects of the present disclosure.

FIG. 3 is an example of video encoding based on device movement, in accordance with various aspects of the present disclosure. In the example depicted in FIG. 3, frames 354a and 354b illustrate one example of motion vector determination for generating encoded video frames that are compressed for transmission. The frames 354a and 354b are divided into blocks (e.g., macroblocks). Blocks 382a-b, 384a-b, 386a-b, and 388a-b are individually labeled. Additional unlabeled blocks are illustrated by the dashed grids on the frames 354a and 354b. Frames 354a and 354b may be consecutive frames according to a temporal sequence of frames of a video. For example, the frames may be ordered according to a time axis 362. Each frame 354a and 354b may have respective edges 372a-b and 374a-b. The frames 354a and 354b may represent an FoV of camera 160 and may be uncompressed frames captured by the camera 160.

The example frames 354a and 354b depict an example person 380 moving across the three-dimensional environment captured by camera 160. When projected to the frame space, the person 380 moves from the negative X direction to the positive X direction (left-to-right in FIG. 3). Motion vectors 394 and 396 are illustrated with reference to the person 380. Example motion vectors 394, 396 are shown in frame 354b and represent motion between the frame 354a and the frame 354b. For example, motion vector 394 points from block 382a to block 386b. This may indicate that what was depicted at the position of the block 382a at the previous frame 354a is now shown at block 386b in the frame 354b. For example, at frame 354a, block 382a shows a portion of the head of the person 380. At frame 354b, the same portion of the head of the person 380 is shown at block 386b. This motion may be due to movement of device 110 (e.g., movement 168 from rotation of device 110 in FIG. 1) resulting in a shifting position of person 380 between frames 354a and 354b. In various other examples, the motion may be due to person 380 moving within the physical environment (e.g., intra-frame motion). In some examples, the shifting of the position of the person may be the result of a combination of movement of the device (and/or DPTZ of the camera 160) and movement within the physical environment (e.g., intra-frame motion).

Motion vector 396 points from block 384a to block 388b. This may indicate that what was shown at the position of block 384b at the previous frame 354a is shown at block 388b at the frame 354b. For example, at frame 354a, block 384a shows a portion of the torso of the person 380. At frame 354b, the same portion of the torso of the person 380 is shown at block 388b. Motion vectors 394, 396 may be used to compress the frame 354b. For example, a subject block 386b may be replaced with a reference to its reference block 382a. Similarly, a subject block 388b may be replaced with a reference to its reference block 384a. The references may include pointers or other indicators of the respective reference blocks 382a, 384a as well as descriptions of the differences between the respective subject and reference blocks. Again, this motion may be due to movement of device 110 (e.g., movement 168 from rotation of device 110 in FIG. 1) resulting in a shifting position of person 380 between frames 354*a* and 354*b*. In various other examples, the motion may be due to person 380 moving within the physical environment (e.g., intra-frame motion). In some examples, the shifting of the position of the person may be the result of a combination of movement of the device (and/or DPTZ of the camera 160) and movement within the physical environment (e.g., intra-frame motion).

The motion vectors shown in FIG. 3 may be P-frame motion vectors because the motion vectors may terminate in frames that are positioned after the originating frames according to the temporal sequence of the video. For example, the motion vector 394 begins at frame 354*a* (e.g., at block 382*a*) and terminates at frame 354*b* (e.g., at block 386*b*). In some examples, motion vectors may be bi-directional or B-frames motion vectors that may include motion vectors that terminate at a frame positioned before the originating frame according to the video sequence. Also, the motion vector examples in FIG. 3 move between adjacent blocks. In some examples, motion vectors may move between blocks (and/or pixels) that are not adjacent.

In some examples, a reference frame need not start at a particular grid position, as shown in FIG. 3. In some examples, the macroblocks shown in FIG. 3 may be 16×16 pixel values. Each macroblock may be described by the location of its bottom left pixel value. For example, the block 386*b* is in the twelfth column of the frame 354*b* and the second row. Accordingly, the position of the block 386*b* may be at a position on the two-dimensional grid: (x, y)=(16×12, 16×2). Similarly, the reference block for block 386*b* (e.g., block 382*a*) is in the eleventh column of the frame 354*b* and the second row, making its position on two-dimensional grid: (x, y)=(16×11, 16×2). Accordingly, the motion vector 394 pointing from block 382*a* to block 386*b* may be (16×1, 0). In various examples, the reference block from a reference frame may be anywhere within a search window around the subject block (e.g., around the bottom left of the reference block). In one example, the search window may be (+/−64, 32).

Figure 4:
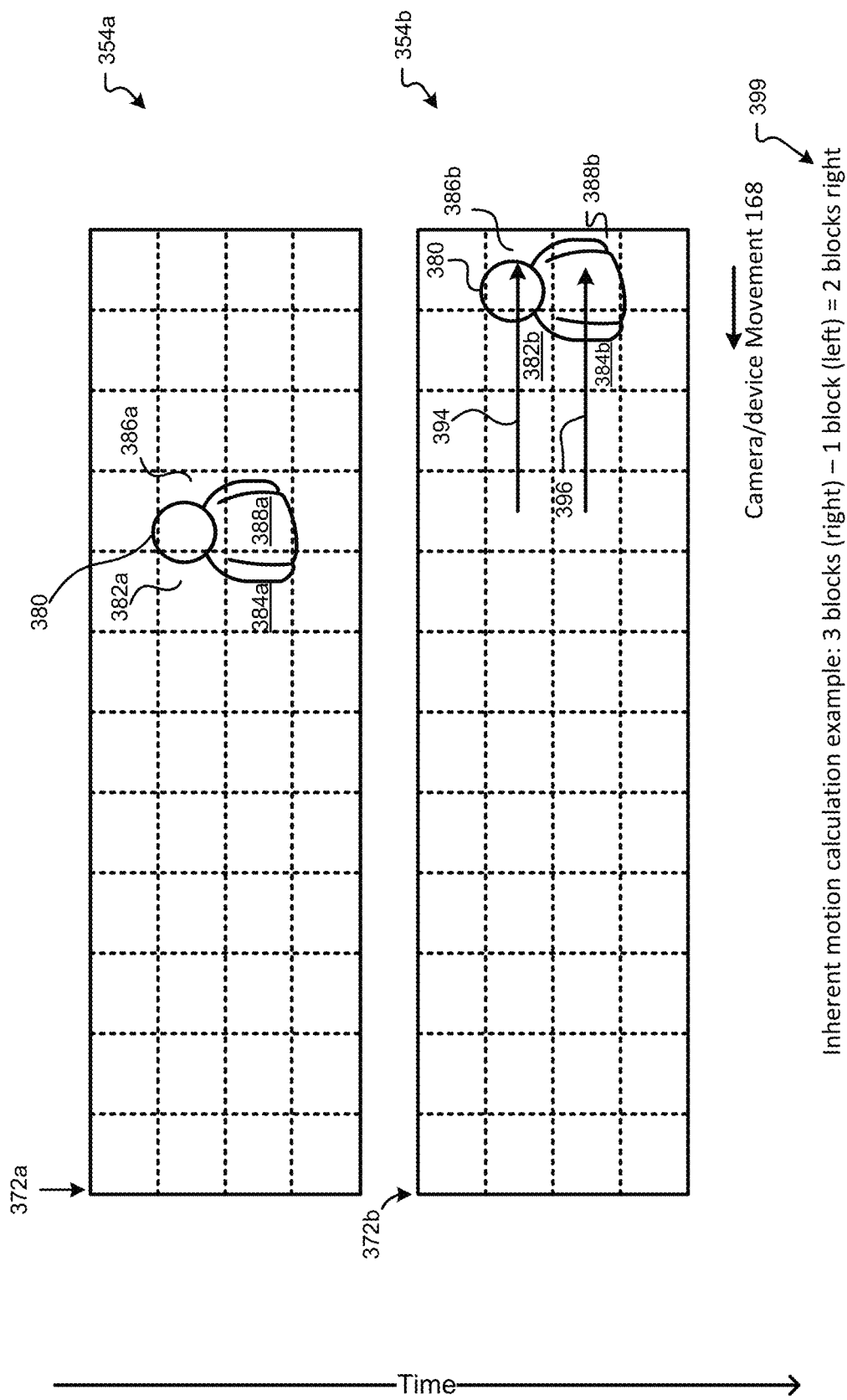
FIG. 4 is another example of video encoding based on device movement, in accordance with various aspects of the present disclosure.

FIG. 4 is another example of video encoding based on device movement, in accordance with various aspects of the present disclosure. In the example depicted in FIG. 4, person 380 has shifted to the right between frame 354*a* and frame 354*b*. Accordingly, the total motion may be determined between frame 354*a* and frame 354*b* by locating corresponding macroblocks (and/or pixels) and determining the shift between the corresponding macroblocks (and/or pixels). In FIG. 4, block 386*a* in frame 354*a* has shifted to block 386*b* in frame 354*b*.

Block 386*b* is in the second row and twelfth column (16×12, 16×2) The reference block for block 386*b* (block 386*a*) is at position (16×9, 16×2). Accordingly, the total motion between block 386*a* and block 386*b* may be (16×3, 0). However, movement 168 may indicate that the camera 160 was moved (and/or panned) to the left by 1 macroblock (−16×1, 0). This motion may be subtracted from the total motion to determine the intra-frame motion (e.g., the inherent motion of person 380 between frames 354*a*, 354*b*). The inherent motion is (16×3, 0)+(−16×1, 0)=(16×2, 0). Accordingly, the motion vector (16×2, 0) represents the inherent motion of person 380 between frame 354*a* and frame 354*b*, accounting for the movement 168 of the camera 160. It should be appreciated that the movement 168 may be in any direction and that the inherent motion may be calculated along both the x and y axis. Inherent motion calculation 399 depicts a simplified expression for the inherent motion depicted in FIG. 4, as there has been a shift to the right of block 386*a* by 3 blocks, but a movement 168 left by 1 block, there is inherent motion of 2 blocks to the right (3 blocks right −1 block left=2 blocks right).

In various examples, after calculating motion vectors based on the inherent motion, the motion due to movement 168 of camera 160 may be encoded using metadata that merely instructs the decoder to shift macroblocks by the appropriate amount rather than calculating and encoding individual per-block motion vectors. In the current example, all macroblocks (or pixels) may be shifted to the right by a single block (or pixel, depending on the implementation) to account for movement 168 of camera 160 (left by 1 macroblock). In various examples, some macroblocks may not have a corresponding block in the previous frame. In such cases, such "new" macroblocks may be intra-encoded.

In various examples, only calculating motion vectors to represent inherent motion in the scene (as opposed to total motion) may result in a large amount of conserved bandwidth and/or may allow for additional quality (e.g., through the use of additional bits to improve image quality) at a given, set bandwidth.

Figure 5A:
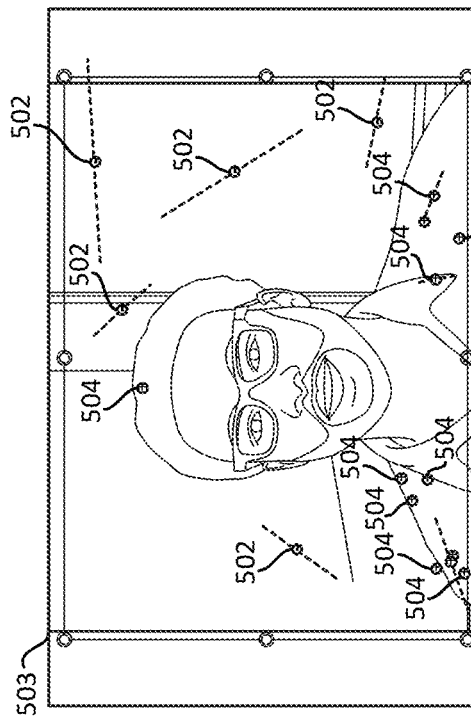
FIG. 5A depicts an example of an input frame of image data captured during a video communication session, according to various embodiments of the present disclosure.

FIG. 5A depicts an example of an input frame of image data 501 captured during a video communication session, according to various embodiments of the present disclosure. In the example, the input frame of image data 501 may be captured by a camera 160 of device 110. In the example depicted in FIG. 5A, a man in a physical environment (e.g., a room) is shown facing the camera and communicating during a video call.

Figure 5B:
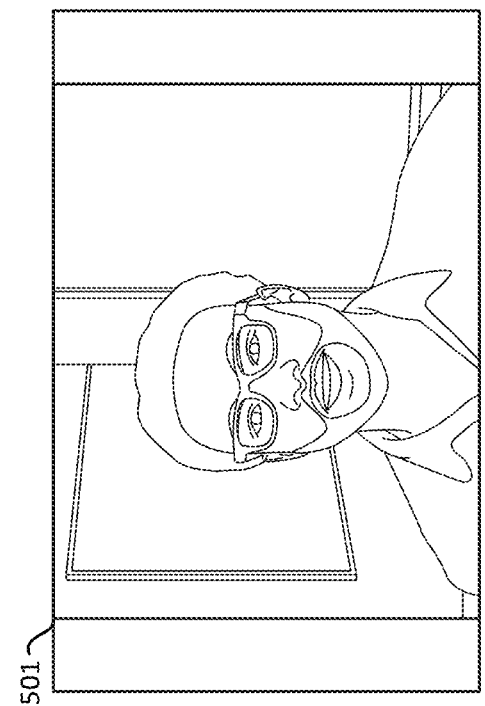
FIG. 5B depicts an example of segmentation mask data generated using the frame of image data of FIG. 5A, according to various embodiments of the present disclosure.

FIG. 5B depicts an example of segmentation mask data generated using the frame of image data of FIG. 5A, according to various embodiments of the present disclosure. In FIG. 5B, image segmentation has been performed to determine pixels and/or macroblocks that correspond to the same object represented in the image data. For example, reference 502 represents areas (e.g., portions of the image data along the dashed lines associated with reference 502) of the frame 503 that correspond to the background image data representing the physical environment (e.g., a wall and/or window behind that man depicted in the frame). Reference 504 represents image data (e.g., pixels and/or macroblocks) representing portions of the foreground image data (e.g., pixels/macroblocks representing the man). Frame 503 may be a segmentation mask labeling each pixel as either an object class (e.g., man, background, foreground, dog, cat, car keys, etc.) or simply as "foreground" or "background," depending on the particular segmentation algorithm and/or implementation.

Figure 5C:
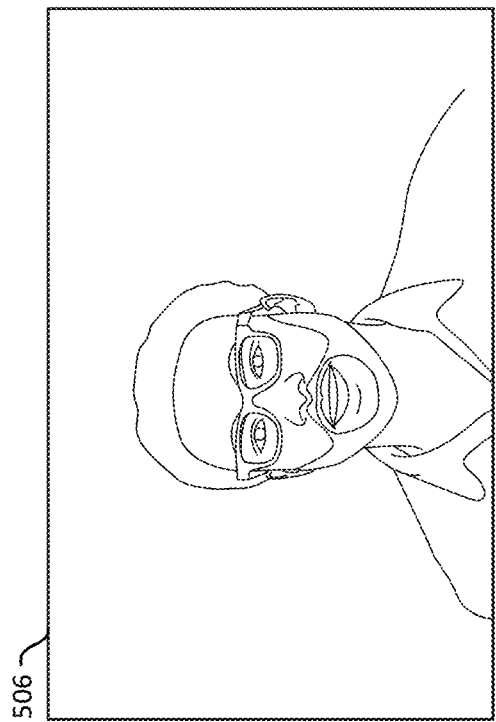
FIG. 5C depicts an example of foreground image data that may be sent to a recipient device, according to various embodiments of the present disclosure.

FIG. 5C depicts an example of foreground image data 506 that may be sent to a recipient device, according to various embodiments of the present disclosure. After generating a segmentation mask (e.g., frame 503), the segmentation mask may be used to segment foreground (and/or background) image data to generate new frames of image data, as desired. For example, foreground image data 506 is a frame of image data that depicts only the man from FIG. 5A, without the room and/or background behind the man.

In various examples, frames of image data designated as background images may be sent by device 110 to a recipient device (e.g., to other participants in a video call). Metadata in the background images (e.g., data in a header of the background image frames designating the frames as background reference frames) may be used to instruct a decoder of the recipient device(s) to save the background image frames in memory as background reference frames.

Thereafter, video encoder 172 of device 110 may generate foreground image data 506 representing a segmented portion of the foreground (e.g., image data representing one or more people and/or other objects in the foreground of the image) that is separate from the background. The foreground image data 506 may be sent to the decoder. In some examples, metadata sent with the foreground image data 506 may instruct the decoder to combine the foreground image data 506 with previously-sent background image data. Accordingly, the decoder of the recipient device may overlay the foreground image data 506 over the background image data by replacing pixels and/or macroblocks of the background image data at positions corresponding to the foreground image data (e.g., at the pixel addresses/macroblock addresses of the foreground image data 506) with pixel values/macroblock values of the foreground image data 506.

In various examples, the background may remain relatively static during video communication. Accordingly, continually encoding and sending image data representing a static background may be wasteful and/or unnecessary. Instead, background image frames may be sent and stored in memory by the recipient device occasionally. In various examples, the frequency at which background image frames are sent to the recipient device may depend on the amount of motion of device 110. For example, as device 110 moves the background may change, requiring new background image frames to be sent to the recipient device for use as reference frames. Sending the background image frames only upon occasion saves bandwidth and/or processing power as the portion of the captured image corresponding to the background need not be continually encoded and sent. Instead, previously-stored background image data may be used.

Further, in some examples, the background image data sent to the recipient device may be of a wider FoV relative to what is displayed on the display of the recipient device. In various examples, the encoder and/or decoder of a video codec may be configured to generate cropped versions of frames for display. Accordingly, if the camera 160 pans and/or device 110 rotates or otherwise moves, the same background image data may still be used as a reference frame, so long as the previously-saved background image data encompasses the FoV currently being captured by camera 160. In various examples, a panoramic (and/or any other FoV such as 270°, 180°, etc.) FoV background reference frame may be generated either on the encoder side, or constructed over time on the decoder side, and may be saved in memory by the decoder. Accordingly, the background image data may continue to be used as a reference frame even as the sender device 110 rotates and/or moves. In such scenarios, the foreground image data 506 sent by device 110 may be overlaid (as described above) over the appropriate portion of the wide-angle background reference frame stored by the decoder. The background reference frame may be updated over time as the background changes and/or as previously-unseen portions of the background come into view. Overlaying foreground image data may refer to replacing pixel values of the stored, background reference frame with pixel values of the transmitted foreground image data (e.g., foreground image data 506). The pixels that are replaced may correspond to the relative position of the foreground image data with respect to the background.

Additionally, sending only the foreground image data segmented from the background saves additional bandwidth as such frames (e.g., foreground image data 506) comprise only those pixels classified by the segmentation mask as foreground without needing to encode background pixels/macroblocks. Upon receipt, the decoder may generate a new frame for display comprising the previously-stored background image frame with pixel values of the foreground image data 506 replacing pixels of the background image data (at the appropriate pixel addresses (e.g., the pixel addresses/macroblock addresses of pixels representing the man in the foreground image data 506)).

Figure 6:
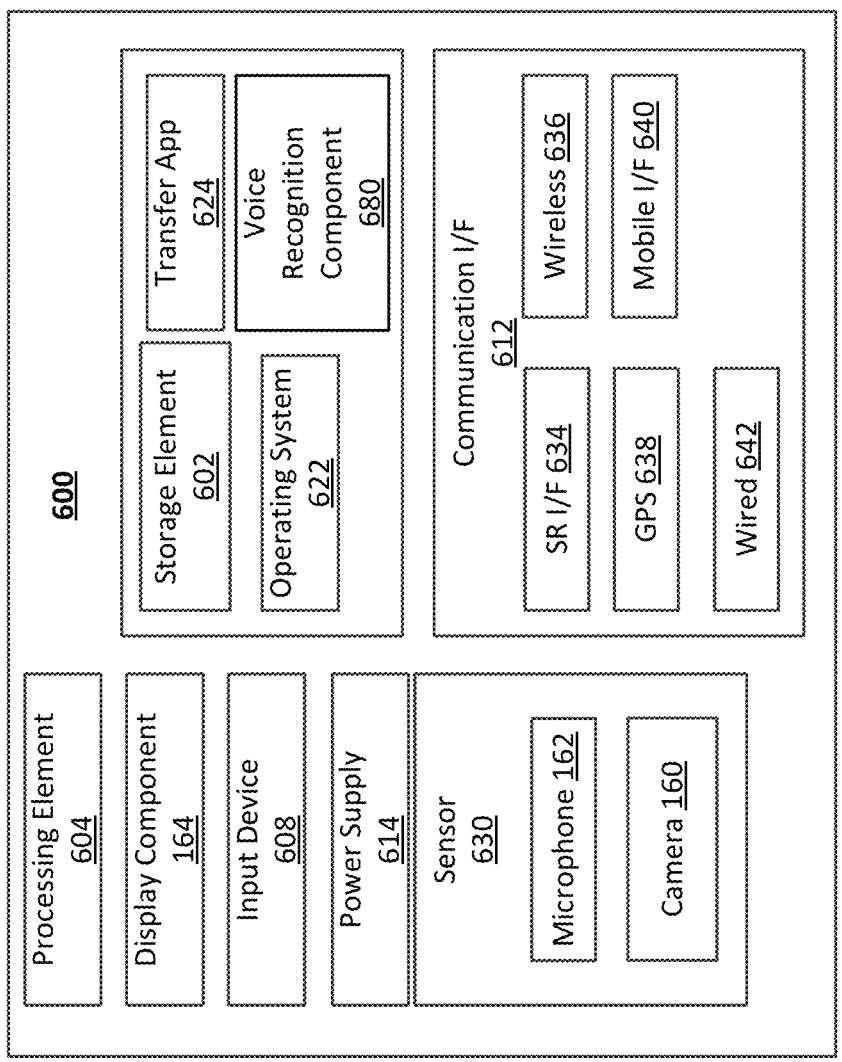
FIG. 6 is a block diagram showing an example system of a computing device that may be used in accordance with various embodiments described herein.

FIG. 6 is a block diagram showing an example system 600 of a computing device that may be used to implement, at least in part, one or more of the components described herein for encoding video based on device motion cues, in accordance with various aspects of the present disclosure. It will be appreciated that not all devices will include all of the components of the system 600 and some user devices may include additional components not shown in the system 600. The system 600 may include one or more processing elements 604 for executing instructions and retrieving data stored in a storage element 602. The processing element 604 may comprise at least one processor. Any suitable processor or processors may be used. For example, the processing element 604 may comprise one or more digital signal processors (DSPs), tensor processing units, graphical processing units, etc. In some examples, the processing element 604 may be effective to determine a wakeword and/or to stream audio data to natural language processing system 120. The storage element 602 can include one or more different types of memory, data storage, or computer-readable storage media devoted to different purposes within the system 600. For example, the storage element 602 may comprise flash memory, random-access memory, disk-based storage, etc. Different portions of the storage element 602, for example, may be used for program instructions for execution by the processing element 604, storage of images or other digital works, and/or a removable storage for transferring data to other devices, etc.

The storage element 602 may also store software for execution by the processing element 604. An operating system 622 may provide the user with an interface for operating the computing device and may facilitate communications and commands between applications executing on the system 600 and various hardware thereof. A transfer application 624 may be configured to receive images, audio, and/or video from another device (e.g., a mobile device, image capture device, and/or display device) or from an image sensor and/or microphone included in the system 600. In some examples, the transfer application 624 may also be configured to send the received voice requests to one or more voice recognition servers (e.g., natural language processing system 120).

When implemented in some user devices, the system 600 may also comprise a display component 164. The display component 164 may comprise one or more light-emitting diodes (LEDs) or other suitable display lamps. Also, in some examples, the display component 164 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 164 may be effective to display content determined provided by a skill executed by the processing element 604 and/or by another computing device.

The system 600 may also include one or more input devices 608 operable to receive inputs from a user. The input devices 608 can include, for example, a push button, touch pad, touch screen, wheel, joystick, keyboard, mouse, trackball, keypad, light gun, game controller, or any other such device or element whereby a user can provide inputs to the system 600. These input devices 608 may be incorporated into the system 600 or operably coupled to the system 600 via wired or wireless interface. In some examples, system 600 may include a microphone or an array of microphones for capturing sounds, such as voice requests. A voice recognition component 680 may interpret audio signals of sound captured by microphone. In some examples, voice recognition component 680 may listen for a "wakeword" to be received by microphone 162. Upon receipt of the wakeword, voice recognition component 680 may stream audio to a voice recognition server for analysis, such as natural language processing system 120. In various examples, voice recognition component 680 may stream audio to external computing devices via communication interface 612.

When the display component 164 includes a touch-sensitive display, the input devices 608 can include a touch sensor that operates in conjunction with the display component 164 to permit users to interact with the image displayed by the display component 164 using touch inputs (e.g., with a finger or stylus). The system 600 may also include a power supply 614, such as a wired alternating current (AC) converter, a rechargeable battery operable to be recharged through conventional plug-in approaches, or through other approaches such as capacitive or inductive charging.

The communication interface 612 may comprise one or more wired or wireless components operable to communicate with one or more other computing devices. For example, the communication interface 612 may comprise a wireless communication module 636 configured to communicate on a network, such as a computer communication network, according to any suitable wireless protocol, such as IEEE 802.11 or another suitable wireless local area network (WLAN) protocol. A short range interface 634 may be configured to communicate using one or more short range wireless protocols such as, for example, near field communications (NFC), Bluetooth, Bluetooth LE, etc. A mobile interface 640 may be configured to communicate utilizing a cellular or other mobile protocol. A Global Positioning System (GPS) interface 638 may be in communication with one or more earth-orbiting satellites or other suitable position-determining systems to identify a position of the system 600. A wired communication module 642 may be configured to communicate according to the USB protocol or any other suitable protocol. The system 600 may also include one or more sensors 630 such as, for example, one or more position sensors, camera(s) 160, and/or motion sensors.

Figure 7:
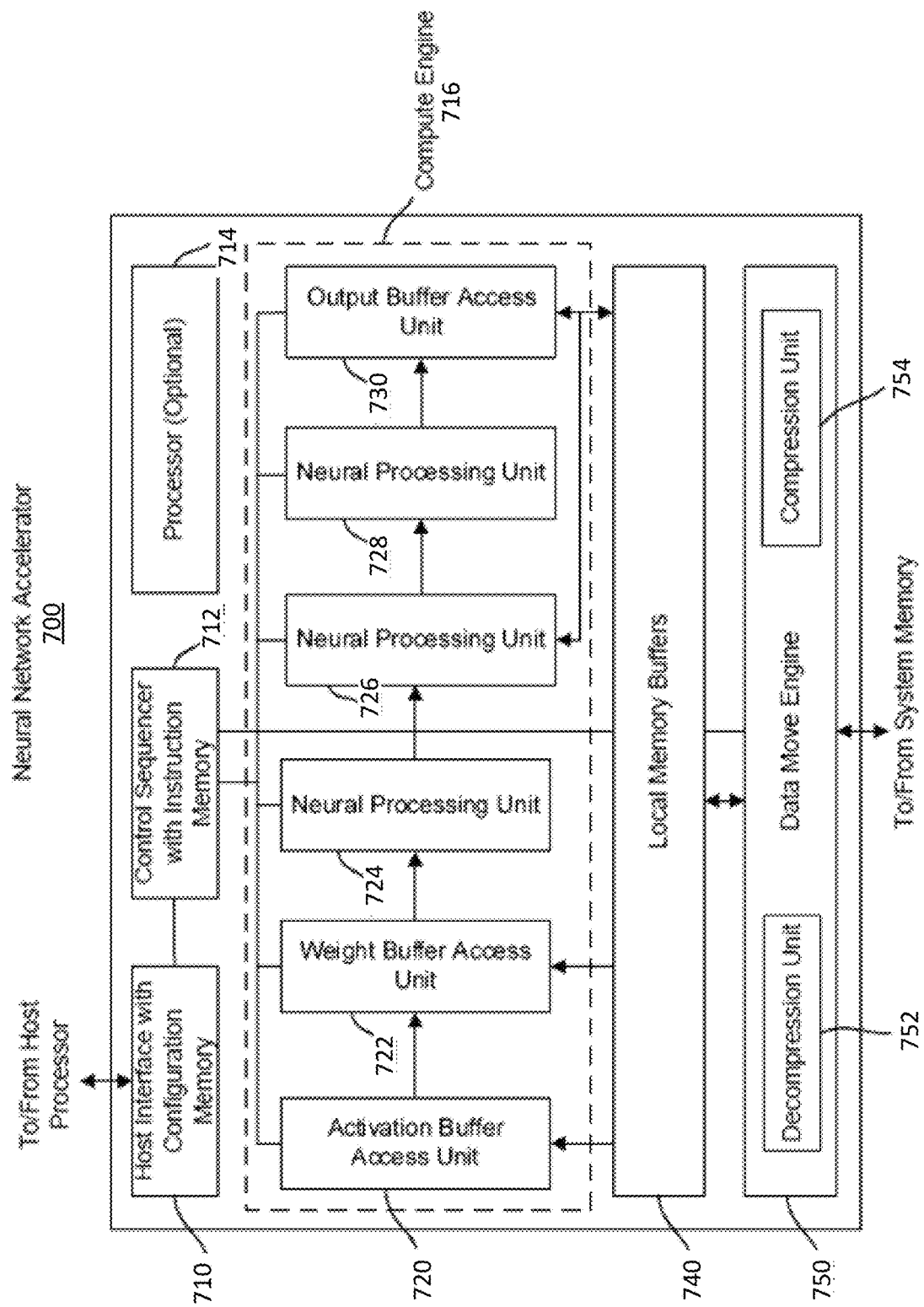
FIG. 7 is a block diagram of an example neural network accelerator that may be used to perform one or more of the various computer visions and/or object selection techniques described herein.

FIG. 7 is a simplified block diagram of an neural network accelerator (NNA) 700 according to certain embodiments. The NNA 700 may be, for example, a dedicated chip set and/or may be integrated into circuitry of the device 110. The NNA 700 comprises a host interface 710, a control sequencer 712, an optional processor 714, an activation buffer access unit 720, a weight buffer access unit 722, a plurality of neural processing units (NPUs) 724, 726, and 728, an output buffer access unit 730, a set of local memory buffers 740, and a data move engine (DME) 750. The activation buffer access unit 720, the weight buffer access unit 722, the NPUs 724, 726, and 728, and the output buffer access unit 730 collectively form a compute engine 716. Along with the control sequencer 712 and the DME 750, the compute engine 716 is responsible for executing instructions. The NNA 700 can be implemented as a standalone computing system or, as shown in FIG. 7, as part of a computing system comprising a host processor and system memory. In various examples, NNA 700 may be used to implement various computer vision techniques, voice processing techniques, natural language processing techniques, and/or other machine learning techniques described herein. In various examples, machine learning models implemented in whole or in part by NNA 700 may be used to detect objects in image data and/or predict levels of engagement with device 110, as described above. In various examples, NNA 700 may be used to implement one or more aspects of video encoder 172.

The NNA 700 depicted in FIG. 7 is merely an example and is not intended to unduly limit the scope of claimed embodiments. One of ordinary skill in the art would recognize many possible variations, alternatives, and modifications. For example, in some implementations, NNA 700 may have more or fewer components than those shown in FIG. 7, may combine two or more components, or may have a different configuration or arrangement of components.

The NNA 700 generally executes one set of instructions at a time. This set of instructions is referred to herein as a "context." At runtime, the NNA 700 sequences and dispatches, using control sequencer 712, instructions from a pre-compiled context for execution. In certain embodiments, each context comprises a set of instructions that ends with a HALT instruction. Contexts are created by a software compiler. The instructions within a context can implement at least part of a neural network. For example, a context can correspond to a complete layer, a partial layer, or multiple layers of the neural network. In some instances, a context can correspond to a complete neural network (e.g., with instructions for an input layer, a hidden layer, and an output layer).

The host interface 710 is a communication interface to the host processor (not depicted) of the local computing system. The local computing system includes system memory for storing data operated on by the NNA (e.g., weights, activations, and output values corresponding to inferences). The NNA 700 may be communicatively coupled to multiple hosts simultaneously, with any one of the hosts being able to program the NNA 700 to execute neural network-related tasks on behalf of the host. The host interface 710 can communicate with the host processor via a standard communication protocol such as, for example, Advanced eXtensible Interface (AXI) protocol. Similarly, the NNA 700 can include a separate communication interface for communicating with the system memory, e.g., to read and write data from the local memory buffers 740 to the system memory. The communication interface to the system memory is, in certain embodiments, integrated into the DME 750. Thus, the DME 750 can also include an AXI interface.

The control sequencer 712 is responsible for sequencing, dispatching and finishing execution of instructions. Some instructions are executed entirely in the control sequencer 712. Other instructions may be dispatched to one or more of the NPUs 724, 726, and 728 for execution, possibly with execution results being returned to the control sequencer 712 for further processing. Still other instructions are executed by the DME 750 to move data to and from the local memory buffers 740. More than one instruction can be in the execution phase at any given time within the NNA 700. The control sequencer 712 can include an instruction memory into which instructions to be executed by the NNA 700 are downloaded from the host processor or loaded from the system memory.

In the example of FIG. 7, the host interface 710 includes a configuration memory. The configuration memory may include one or more registers that are configurable by the host processor to specify parameters relating to the context to be executed, e.g., various context dependent parameter registers (CDPRs).

In certain embodiments, the configuration memory includes a predicate register for synchronizing execution of instructions. Instructions are broadcast by the control sequencer 712 to each component of the compute engine 716 as well as the local memory buffers 740 and the DME 750. Upon receipt of a broadcast instruction, a component may proceed to execute at least part of the instruction in response to determining that the component is capable of handling the instruction. For example, the DME 750 could receive and execute a data move instruction, but the NPUs 724, 726, and 728 could ignore the data move instruction. Because instructions can execute concurrently in different components, it is useful to have a synchronization mechanism to handle any dependencies between instructions. The predicate register can be used to implement such a synchronization mechanism and, in certain embodiments, is a global register visible to internal components of the NNA 700, as well as visible to external objects such as the host processor. Synchronization also helps to prevent conflicts in accessing the local memory buffers 740.

The processor 714 is an optional general purpose processor for performing certain types of processing in parallel with processing performed by the NPUs 724, 726, and 728. For example, processor 714 may include a floating point unit or other arithmetic logic unit for performing general arithmetic operations in parallel with matrix operations performed by the NPUs 724, 726, and 728.

The activation buffer access unit 720 is configured to access one or more activation buffers in the local memory buffers 740. Similarly, the weight buffer access unit 722 and the output buffer access unit 730 are configured to access one or more weight buffers and one or more output buffers, respectively. The activations stored in the activation buffer(s) correspond to activations produced by one or more layers of a neural network being executed on the NNA 700.

The weights stored in the weight buffer(s) are synaptic weights associated with edges between a node of one layer and a node of another layer. Activation and weights are used for certain computations, including for instructions executed by the compute engine 716. The output buffers can store final results or intermediate results (e.g., partial sums) for access by the host processor or the system memory.

The NPUs 724, 726, and 728 perform numerical operations using the activations and weights stored in the local memory buffers 740. Each NPU is configured to perform all or part of a compute instruction. Although FIG. 7 depicts the NPUs 724, 726, and 728 as block components, the NPUs 724, 726, and 728 are not necessarily identical.

The DME 750 is used to bidirectionally move instructions and data between the system memory and NNA local memories (e.g., the activation, the weight, and output buffers that form the local memory buffers 740). The DME 750 can receive data move instructions (e.g., LOAD and STORE instructions) from the control sequencer 712 when such instructions are broadcast. The data move instructions executed by DME 750 can execute concurrently with compute instructions executed by the control sequencer 712 or the compute engine 716.

As shown in FIG. 7, the DME 750 includes a decompression unit 752 and a compression unit 754. In other embodiments, the DME 750 may include a decompression unit or a compression unit, but not both. Further, the location of the compression unit or decompression unit can vary. For example, in another embodiment, the decompression unit 752 can be part of the compute engine 716 and is configured to decompress data stored in the local memory buffers 740 for input of the decompressed data to one or more of the NPUs 724, 726, and 728.

The decompression unit 752 implements a decompression pipeline. The decompression pipeline of the decompression unit 752 involves processing using one or more decompression schemes. The decompression unit 752 can select between using one decompression scheme alone or using multiple decompression schemes in combination. For example, the decompression unit 752 may decompress data using zero value decompression and then further decompress the data using shared value decompression. In the example of zero value plus shared value decompression, the order in which the compression schemes are applied can vary depending on how the decompression unit 752 is implemented. Thus, zero value decompression could be performed first followed by shared value decompression. Alternatively, shared value decompression could be performed first. In general, the order in which zero value decompression and shared value decompression are performed does not matter as the resulting decompressed data would be the same irrespective of which decompression scheme is applied first.

Although the example embodiments are described in connection with zero value compression/decompression and shared value compression/decompression, other techniques for compressing and decompressing data can be implemented. These are merely two examples of compression/decompression schemes that are suitable for use with the types of data involved in neural networks.

In the example of FIG. 7, the decompression unit 752 may be configured to receive compressed data from the system memory and decompress the compressed data, using one or more decompression schemes, to generate decompressed data for storage in the local memory buffers. Alternatively, in certain embodiments, the decompression unit 752 may be configured to receive compressed data from the local memory buffers and decompress the compressed data for use by a processing component of the NNA 700 (e.g., one of the NPUs 724, 726, and 728, or the control sequencer 712). Thus, the data may be stored in either compressed or decompress form within the local memory buffers 740. Irrespective of how the data is stored in the local memory buffers 740, the data may be sent from the system memory to the NNA 700 in compressed form. Sending the data to the NNA in compressed form reduces the amount of time required to send the data.

The compression unit 754 implements a compression pipeline similar to the decompression pipeline discussed above with respect to the decompression unit 752. In certain embodiments, the compression unit 754 is configured to receive uncompressed data produced by the neural network (e.g., output values corresponding to inferences and/or activations generated by a particular layer of the neural network) and apply one or more compression schemes to compress the uncompressed data for storage in the local memory buffers 740 or for storage in the system memory. For example, activations produced by one layer can be compressed for temporary storage in an activation buffer of the local memory buffers 740 until the activations are needed by one of the NPUs 724, 726, 728. Storing the activations in compressed form increases the effective storage capacity of the activation buffer. For the same amount of physical memory, more activations can be stored when the activations are compressed compared to when the activations are stored uncompressed. As another example, inferences produced by the output layer of the neural network or activations produced by a particular layer can be compressed for storage in the system memory.

The local memory buffers 740 are used to abstract the physical implementation of memories that form the activation, weight, and output buffers from NNA components (e.g., the compute engine 716 and the DME 750) that access data in these buffers. The data in the activation, weight, and output buffers is accessed through addressing the buffers individually, with the buffer addresses being mapped to the physical addresses of the memories where the data is stored. In certain embodiments, the memories of the local memory buffers 740 are implemented as static random-access memory (SRAM) devices. However, the local memory buffers 740 can be implemented using other types of memory, both volatile and non-volatile (e.g., flash memory, DRAM, resistive RAMs, and the like). As mentioned above, the data in be stored in the local memory buffers 740 in compressed or decompressed form.

The NPUs 724, 726, and 728 perform numerical operations using the activations and weights stored in the local memory buffers 740. Each NPU is configured to perform all or part of a compute instruction. The compute instruction may, for example, implement at least some of the computation described earlier in connection with processing by a node of a neural network, i.e., computing a weighted sum of input activations multiplied by weights, adding a bias value to the weighted sum, and then applying an activation function. Other types of computations may also be performed by the NPUs 724, 726, and 728 including, for example, identifying the minimum and maximum values among a first set of data values represented by a first vector and a second set of data values represented by a second vector, performing an extended multiply add, subtracting two vectors, and other types of operations applicable to data from a vector or matrix.

Figure 8:
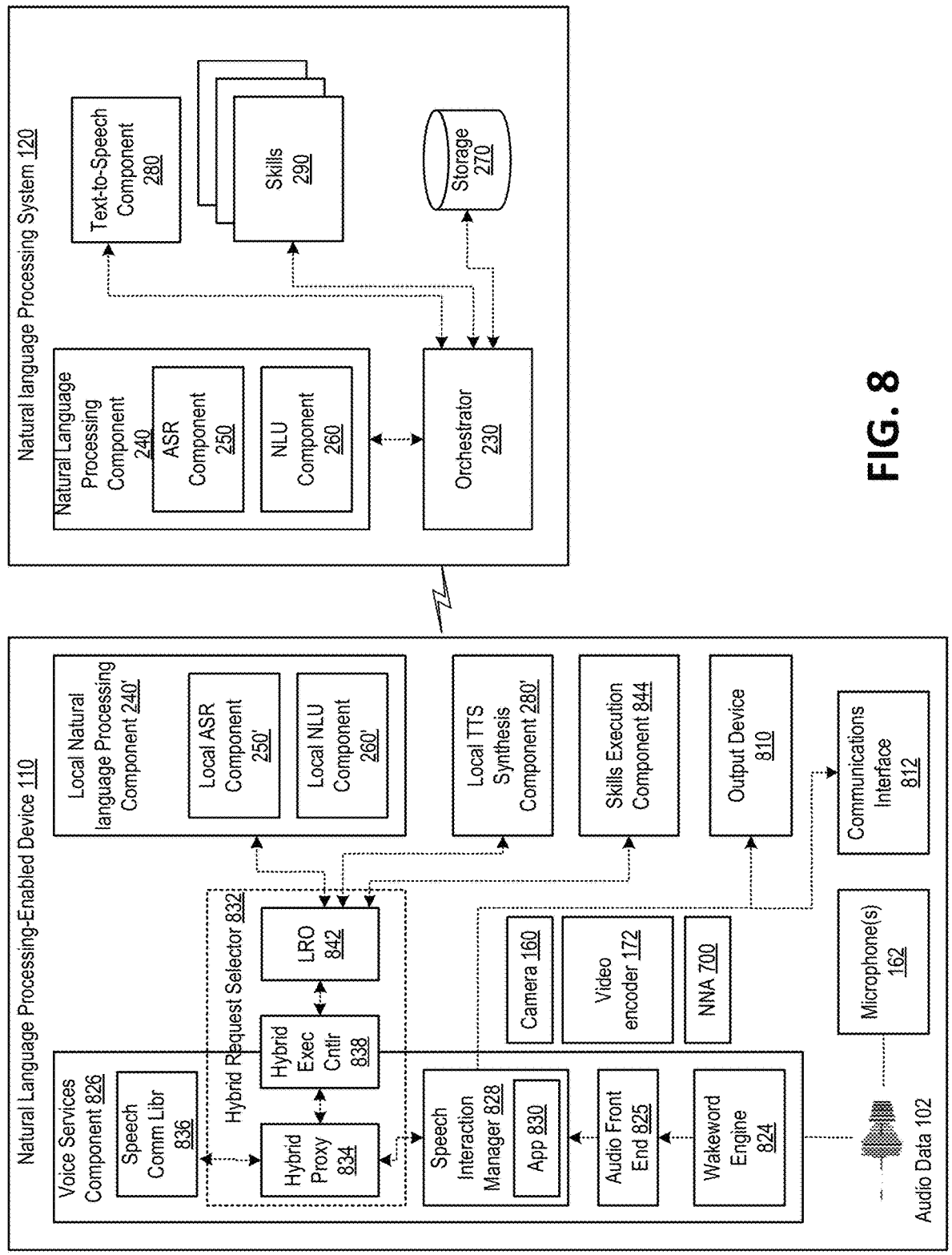
FIG. 8 is a block diagram illustrating a speech processing-enabled device and a speech processing management system, in accordance with embodiments of the present disclosure.

FIG. 8 is a block diagram illustrating a natural language processing-enabled device 110 and a natural language processing system 120, in accordance with embodiments of the present disclosure. In various examples, device 110 may be a natural language processing-enabled device and may include microphones (e.g., far-field microphone arrays) used to transform audio into electrical signals. Natural language processing may then be performed, either locally by the natural language processing-enabled device 110, by one or more other computing devices communicating with the natural language processing-enabled device 110 over a network (e.g., natural language processing system 120), or by some combination of the natural language processing-enabled device 110 and the one or more other computing devices. In various examples, natural language processing-enabled device 110 may include and/or may be configured in communication with output device(s) 810 (e.g., speakers and/or displays) effective to output information obtained in response to a user's spoken request or command, or to output content that may be of interest to one or more users. As used herein, a display of natural language processing-enabled device 110 refers to a display effective to output graphics such as images and/or video. Further, as used herein, a displayless device refers to a device that does not include a display that is effective to render graphical images or text.

In various examples, the device 110 may include the video encoder 172 described herein and/or the NNA 700. As such, device 110 may perform computer vision techniques, audio processing, and/or machine learning techniques locally on device 110 without sending data to remote devices for such processing. Accordingly, the device 110 may be effective to receive commands such as "Computer, focus on me" and/or "Start video call with mom" to control the device 110 to initiate a video call, and/or to follow a particular person during a video call. Additionally, the device 110 may be able to perform object detection, tracking, natural language processing, and/or other techniques that may involve the use of machine learned models on device without necessarily sending data to remote, back-end systems over a communication network.

A natural language processing enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 162 to capture utterances and convert them into digital audio data 102, the natural language processing-enabled device 110 may additionally, or alternatively, receive audio data 102 (e.g., via the communications interface 812) from another device in the environment. In various examples, the natural language processing-enabled device 110 may capture video and/or other image data using an camera 160. Under normal conditions, the natural language processing-enabled device 110 may operate in conjunction with and/or under the control of a remote, network-based or network-accessible natural language processing system 120. The natural language processing system 120 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 120 may be configured to provide particular functionality to large numbers of local (e.g., in-home, in-car, etc.) devices of different users. The WAN is representative of any type of public or private, wide area network, such as the Internet, which extends beyond the environment of the natural language processing-enabled device 110. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 120 may be configured to receive audio data 102 from the natural language processing-enabled device 110, to recognize speech in the received audio data 102, and to perform functions in response to the recognized speech. In some embodiments, these functions involve sending a command, from the natural language processing system 120, to the natural language processing-enabled device 110 to cause the natural language processing-enabled device 110 to perform an action, such as output an audible response to the user speech via output device 810 (e.g., one or more loudspeakers). Thus, under normal conditions, when the natural language processing-enabled device 110 is able to communicate with the natural language processing system 120 over a WAN (e.g., the Internet), some or all of the functions capable of being performed by the natural language processing system 120 may be performed by sending a command over a WAN to the natural language processing-enabled device 110, which, in turn, may process the command for performing actions. For example, the natural language processing system 120, via a remote command that is included in remote response data, may instruct the natural language processing-enabled device 110 to output an audible response (e.g., using a local text-to-speech (TTS) synthesis component 280) to a user's question, to output content (e.g., music) via output device 810 (e.g., one or more loudspeakers) of the natural language processing-enabled device 110, or to control other devices in the local environment (e.g., the user's home). It is to be appreciated that the natural language processing system 120 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the natural language processing-enabled device 110 may include a local voice services component 826. When a user utterance including the wakeword is captured by the microphone 162 of the natural language processing-enabled device 110, the audio data 102 representing the utterance is received by a wakeword engine 824 of the voice services component 826. The wakeword engine 824 may be configured to compare the audio data 102 to stored models used to detect a wakeword (e.g., "Computer") that indicates to the natural language processing-enabled device 110 that the audio data 102 is to be processed for determining an intent. Thus, the wakeword engine 824 is configured to determine whether a wakeword is detected in the audio data 102, and, if a wakeword is detected, the wakeword engine 824 can proceed with routing the audio data 102 to an audio front end (AFE) 825 (sometimes referred to as an acoustic front end (AFE)) of the voice services component 826. If a wakeword is not detected in the audio data 102, the wakeword engine 824 can refrain from sending the audio data 102 to the AFE 825, thereby preventing the audio data 102 from being further processed. The audio data 102 can be discarded.

The AFE 825 is configured to transform the audio data 102 received from the wakeword engine 824 into data for processing by a suitable ASR component and/or NLU component. The AFE 825 may reduce noise in the audio data 102 and divide the digitized audio data 102 into frames representing a time intervals for which the AFE 825 determines a number of values, called features, representing the qualities of the audio data 102, along with a set of those values, called a feature vector, representing the features/qualities of the audio data 102 within the frame. Many different features may be determined, and each feature represents some quality of the audio data 102 that may be useful for ASR processing and/or NLU processing. A number of approaches may be used by the AFE 825 to process the audio data 102, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 825 is configured to use beamforming data to process the received audio data 102. Beamforming can be used to distinguish between the directions from which speech and noise originate. Accordingly, the microphones 162 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 102, used by the AFE 825 in beamforming, may be determined based on results of the wakeword engine 824's processing of the audio data 102. For example, the wakeword engine 824 may detect the wakeword in the audio data 102 from a first microphone 162 at time, t, while detecting the wakeword in the audio data 102 from a second microphone 162 a millisecond later in time (e.g., time, t+1 millisecond), and so on and so forth, for any suitable number of audio signals corresponding to multiple microphones 162 in a microphone array.

A speech interaction manager (SIM) 828 of the voice services component 826 may receive the audio data 102 that has been processed by the AFE 825. The SIM 828 may manage received audio data 102 by processing request data and non-speech noise or sounds as events, and the SIM 828 may also manage the processing of commands that are used to respond to the user speech or non-speech noise or sounds (e.g., by controlling the action(s) of the natural language processing-enabled device 110). The SIM 828 may include one or more client applications 830 for performing various functions at the natural language processing-enabled device 110.

A hybrid request selector component 832 of the natural language processing-enabled device 110 is shown as including a hybrid proxy component (HP) 834, among other components. The HP 834 can be implemented as a layer within the voice services component 826 that is located between the SIM 828 and a speech communication library (SCL) 836, and may be configured to proxy traffic to/from the natural language processing system 120. For example, the HP 834 may be configured to pass messages between the SIM 828 and the SCL 836 (such as by passing events and instructions there between), and to send messages to/from a hybrid execution controller component (HEC) 838 of the hybrid request selector component 832. For instance, command data received from the natural language processing system 120 can be sent to the HEC 838 using the HP 834, which sits in the path between the SCL 836 and the SIM 828. The HP 834 may also be configured to allow audio data 102 received from the SIM 828 to pass through to the natural language processing system 120 (via the SCL 836) while also receiving (e.g., intercepting) this audio data 102 and sending the received audio data 102 to the HEC 838 (sometimes via an additional SCL).

As will be described in more detail below, the HP 834 and the HEC 838 are configured to perform a handshake procedure to connect to each other. As part of this handshake procedure, the HP 834 and the HEC 838 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 838 determines whether to accept or reject the connection request from the HP 834. If the HEC 838 rejects the HP's 834 connection request, the HEC 838 can provide metadata to the HP 834 that provides a reason why the connection request was rejected.

A local natural language processing component 240' (sometimes referred to as a "natural language processing component," a "spoken language understanding (SLU) component," a "speech engine," or an "engine") is configured to process audio data 102 (e.g., audio data 102 representing user speech, audio data 102 representing non-speech noise or sounds, etc.). In some embodiments, the hybrid request selector component 832 may further include a local request orchestrator component (LRO) 842. The LRO 842 is configured to notify the local natural language processing component 240' about the availability of new audio data 102 that represents user speech, and to otherwise initiate the operations of the local natural language processing component 240' when new audio data 102 becomes available. In general, the hybrid request selector component 832 may control the execution of the local natural language processing component 240', such as by sending "execute" and "terminate" events/instructions to the local natural language processing component 240'. An "execute" event may instruct the local natural language processing component 240' to continue any suspended execution based on audio data 102 (e.g., by instructing the local natural language processing component 240' to execute on a previously-determined intent in order to generate a command). Meanwhile, a "terminate" event may instruct the local natural language processing component 240' to terminate further execution based on the audio data 102, such as when the natural language processing-enabled device 110 receives command data from the natural language processing system 120 and chooses to use that remotely-generated command data.

The LRO 842 may interact with a skills execution component 844 that is configured to receive intent data output from the local natural language processing component 240' and to execute a skill based on the intent.

To illustrate how the natural language processing-enabled device 110 can operate at runtime, consider an example where a user utters an expression, such as "Computer, turn off the kitchen lights." The audio data 102 is received by the wakeword engine 824, which detects the wakeword "Computer," and forwards the audio data 102 to the SIM 828 via the AFE 825 as a result of detecting the wakeword. The SIM 828 may send the audio data 102 to the HP 834, and the HP 834 may allow the audio data 102 to pass through to the natural language processing system 120 (e.g., via the SCL 836), and the HP 834 may also input the audio data 102 to the local natural language processing component 240' by routing the audio data 102 through the HEC 838 of the hybrid request selector 832, whereby the LRO 842 notifies the local natural language processing component 240' of the incoming audio data 102. At this point, the hybrid request selector 832 may wait for response data from the natural language processing system 120 and/or the local natural language processing component 240'.

The local natural language processing component 240' is configured to receive the audio data 102 from the hybrid request selector 832 as input, to recognize speech (and/or non-speech audio events) in the audio data 102, to determine an intent (e.g., user intent) from the recognized speech (or non-speech audio event). This intent can be provided to the skills execution component 844 via the LRO 842, and the skills execution component 844 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 844 (and/or the natural language processing system 120) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network 104. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 102 to convert the audio data 102 into text data (sometimes referred to herein as "ASR text data," an "ASR result", or "ASR data"). ASR transcribes audio data 102 into text data representing the words of the user speech contained in the audio data 102. A spoken utterance in the audio data 102 can be input to the local ASR component 250', which then interprets the utterance based on the similarity between the utterance and pre-established language models available to the local natural language processing component 240'. In some embodiments, the local ASR component 250' outputs the most likely text recognized in the audio data 102, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the natural language processing-enabled device 110 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 844) based on the intent data and/or the slot data. Generally, the local NLU component 260' takes textual input (such as text data generated by the local ASR component 250') and attempts to make a semantic interpretation of the ASR text data.

Natural Language Processing System

In other situations, the natural language processing-enabled device 110 may send the audio data 102 to the natural language processing system 120 for processing. As described above, the natural language processing-enabled device 110 may capture audio using the microphone 162, and send audio data 102 (e.g., representing a spoken user request), corresponding to the captured audio, to the natural language processing system 120. The natural language processing-enabled device 110 may include a wakeword detection component that detects when input audio includes a spoken wakeword, and when the wakeword is detected, the audio data 102 is sent by the natural language processing-enabled device 110 to the natural language processing system 120.

Upon receipt by the natural language processing system 120, the audio data 102 may be sent to an orchestrator 230. The orchestrator 230 may include memory and logic that enables the orchestrator 230 to send various pieces and forms of data to various components of the system.

Similar to the operation described above with respect to the local natural language processing component 240' of the natural language processing-enabled device 110, the orchestrator 230 may send the audio data 102 to a natural language processing component 240. An ASR component 250 of the natural language processing component 240 transcribes the audio data 102 into one or more hypotheses representing speech contained in the audio data 102. The natural language processing component 240 interprets the speech in the audio data based on a similarity between the characteristics of the audio data corresponding to the speech and pre-established language models. For example, the natural language processing component 240 may compare the audio data 102 with models for sounds (e.g., subword units such as phonemes) and sequences of sounds to identify words that match the sequence of sounds in the speech represented in the audio data 102. The natural language processing component 240 may send text data generated thereby to an NLU component 260 of the natural language processing component 240. The text data output by the natural language processing component 240 may include a top scoring hypothesis of the speech represented in the audio data 102 or may include an N-best list including a group of hypotheses of the speech represented in the audio data 102, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 120) to complete the intent. For example, if the text data corresponds to "Play the new album by [Musical_Artist]", the NLU component 260 may determine the user intended to invoke a music playback intent to play the identified album.

The natural language processing system 120 may include a non-transitory computer-readable memory storage 270, storing various instructions for operation of the natural language processing system 120.

As described above, the natural language processing system 120 may include one or more skills 290. The natural language processing system 120 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 120 and the natural language processing-enabled device 110 described herein may be implemented in software, hardware, firmware, or some combination thereof.

The natural language processing system 120 may reside on natural language processing-enabled device 110, in a cloud computing environment, or some combination thereof. For example, the natural language processing-enabled device 110 may include computing equipment, some portion of which is configured with some or all of the components or functionality of natural language processing system 120 and another portion of which is configured with some or all of the components or functionality of computing device(s) used in natural language processing system 120. The natural language processing-enabled device 110 may then perform a variety of functions on its own (such as when remote communications are unavailable), and/or may communicate (when capable) with computing device(s) and/or the natural language processing system 120 to perform other functions. Alternatively, all of the functionality may reside on the natural language processing-enabled device 110 or remotely.

FIGS. 9A-9B illustrate examples of establishing media connections between devices according to embodiments of the present disclosure. In some examples, an originating device 110 may have a publicly accessible IP address and may be configured to establish a real-time transport (RTP) protocol communication session directly with a session initiation protocol (SIP) endpoint 1050. The SIP endpoint 1050 may correspond to a device 110, a component within the gateway system 1025, a gateway component configured to interface with a remote network, and/or a device associated with the remote network itself. To enable the originating device 110 to establish the RTP communication session, the gateway system 1025 may include Session Traversal of User Datagram Protocol (UDP) Through Network Address Translators (NATs) system (e.g., STUN system 1010). The STUN system 1010 may be configured to allow NAT clients (e.g., an originating device 110 behind a firewall) to setup calls to a Voice over Internet Protocol (VoIP) provider hosted outside of the local network by providing a public IP address, the type of NAT they are behind, and a port identifier associated by the NAT with a particular local port. As illustrated in FIG. 10A, the originating device 110 may perform (1012) IP discovery using the STUN system 1010 and may use this information to set up an RTP communication session 1014 (e.g., UDP communication) between the originating device 110 and the SIP endpoint 1050 to establish a call.

In some examples, the originating device 110 may not have a publicly accessible IP address. For example, in some types of NAT the originating device 110 cannot route outside of the local network. To enable the originating device 110 to establish an RTP communication session, the gateway system 1025 may include Traversal Using relays around NAT (TURN) system 1020. The TURN system 1020 may be configured to connect the originating device 110 to the SIP endpoint 1050 when the originating device 110 is behind a NAT. As illustrated in FIG. 10B, the originating device 110 may establish (1022) an RTP session with the TURN system 1020 and the TURN system 1020 may establish (1024) an RTP session with the SIP endpoint 1050. Thus, the originating device 110 may communicate with the SIP endpoint 1050 via the TURN system 1020. For example, the originating device 110 may send audio data and/or image data to the gateway system 1025 and the gateway system 1025 may send the audio data and/or the image data to the SIP endpoint 1050. Similarly, the SIP endpoint 1050 may send audio data and/or image data to the gateway system 1025 and the gateway system 1025 may send the audio data and/or the image data to the originating device 110.

In some examples, the system may establish communication sessions using a combination of the STUN system 1010 and the TURN system 1020 without departing from the disclosure. For example, a communication session may be more easily established/configured using the TURN system 1020, but may benefit from latency improvements using the STUN system 1010. Thus, the system may use the STUN system 1010 when the communication session may be routed directly between two devices and may use the TURN system 1020 for all other communication sessions. Additionally or alternatively, the system may use the STUN system 1010 and/or the TURN system 1020 selectively based on the communication session being established. For example, the system may use the STUN system 1010 when establishing a communication session between two devices (e.g., point-to-point) within a single network (e.g., corporate LAN and/or WLAN), but may use the TURN system 1020 when establishing a communication session between two devices on separate networks and/or three or more devices regardless of network(s).

When the communication session goes from only two devices to three or more devices, the system may need to transition from the STUN system 1010 to the TURN system 1020. Thus, if the system anticipates three or more devices being included in the communication session, the communication session may be performed using the TURN system 1020. Similarly, when the communication session goes from three or more devices to only two devices, the system may need to transition from the TURN system 1020 to the STUN system 1010.

While FIGS. 9A-9B illustrate an RTP communication session being established between the originating device 110 and the SIP endpoint 1050, the present disclosure is not limited thereto and the RTP communication session may be established between the originating device 110 and a gateway component or other device associated with the SIP endpoint 1050 without departing from the present disclosure. Additionally or alternatively, while FIGS. 10A-10B illustrate examples of enabling communication sessions using the SIP protocol, the disclosure is not limited thereto and the gateway system 1025 may use any protocols known to one of skill in the art.

While FIGS. 9A-9B illustrate examples of enabling communication sessions using a data connection (e.g., using Voice over Internet Protocol (VoIP), session initiation protocol (SIP), and/or the like), the disclosure is not limited thereto and the various devices described herein may enable communication sessions using any type of network without departing from the disclosure. For example, the natural language processing system 120 and/or the gateway system 1025 may enable communication sessions using a cellular connection (e.g., mobile phone network) or other external network without departing from the disclosure. Thus, the natural language processing system 120 may be configured to enable voice commands (e.g., perform ASR, NLU, etc. to identify a spoken command included in audio data), whereas the gateway system 1025 may be configured to enable communication sessions using the cellular connection. For example, the gateway system 1025 may send instructions (e.g., command data) to endpoints (e.g., caller devices, such as the device 110) instructing the endpoint to establish a communication session (e.g., dial a telephone number) in response to the voice command.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
    generating, by a camera of a device, a first frame of image data representing a first view of a physical environment, the first frame of image data comprising a first macroblock at a first location in the first frame, the first macroblock representing a first grouping of pixels;
    controlling a motor of the device to move at least a portion of the device comprising the camera by a first amount in a first direction;
    generating, by the camera of the device, a second frame of image data representing a second view of the physical environment, the second frame of image data comprising a second macroblock at a second location in the second frame, wherein the second macroblock of the second frame corresponds to the first macroblock of the first frame shifted by a second amount in the first direction;
    determining an output frame representing inherent motion between the first frame and the second frame by subtracting a first vector representing the first amount from a second vector representing the second amount;
    determining a first motion vector representing at least a portion of the inherent motion between the first frame and the second frame;
    generating first data effective to cause a decoder to shift a position of a third macroblock of the output frame by the first amount in a second direction opposite the first direction prior to display;
    sending the first data to a recipient device;
    sending the output frame to the recipient device;
    determining a first number of times that the motor of the device moves over a first period of time;
    sending a first plurality of background reference frames to the recipient device at a first frequency;
    determining a second number of times that the motor of the device moves over a second period of time;
    determining that the second number of times is greater than the first number of times; and
    sending a second plurality of background reference frames to the recipient device at a second frequency that is greater than the first frequency.

2. The method of claim 1, further comprising:
    generating, by the camera of the device, a third frame of image data;
    generating header data for the third frame of image data designating the third frame of image data as a first background reference frame of the first plurality of background reference frames;
    sending the first background reference frame to the recipient device, wherein the recipient device is effective to store the first background reference frame in memory;
    generating, by the camera, a fourth frame of image data;
    performing segmentation on the fourth frame of image data to determine a first set of macroblocks of the fourth frame corresponding to foreground image data and a second set of macroblocks of the fourth frame corresponding to background image data;
    generating a second output frame comprising the first set of macroblocks; and
    sending the second output frame to the recipient device, wherein the recipient device is effective to replace a third set of macroblocks of the first background reference frame with the first set of macroblocks.

3. The method of claim 1, further comprising:
    generating, by the camera, a third frame of image data comprising a first field-of-view of the physical environment;
    generating a cropped version of the third frame of image data comprising a second field-of-view that is smaller relative to the first field-of-view;
    generating, by the camera, a fourth frame of image data comprising the first field-of-view;
    generating header data for the fourth frame of image data designating the fourth frame of image data as a first background reference frame of the first plurality of background reference frames; and
    sending the fourth frame to the recipient device, wherein the recipient device is effective to store the fourth frame in memory as a reference frame used to decode subsequent frames of video data.

4. A method comprising:
    generating, by a camera of a first device, a first frame of image data representing a first view of a physical environment;
    causing the first device to move the camera by a first amount in a first direction;
    generating, by the camera of the first device, a second frame of image data representing a second view of the physical environment;
    determining intra-frame motion by subtracting a first vector representing movement of the camera by the first amount in the first direction from a second vector representing motion between the first frame and the second frame;
    determining motion vector data representing motion between the first frame and the second frame based at least in part on the intra-frame motion;
    generating an encoded representation of the second frame of image data comprising the motion vector data;
    sending the encoded representation of the second frame of image data to a second device;
    determining a first number of times that the camera moves over a first period of time;
    sending background image data to the second device at a first frequency;
    determining a second number of times that the camera moves over a second period of time;
    determining that the second number of times is greater than the first number of times; and
    sending background image data to the second device at a second frequency that is greater than the first frequency.

5. The method of claim 4, further comprising:
    sending, by the first device, a first signal indicating the first amount and the first direction to a video encoder component; and determining, by the video encoder component, the first vector based at least in part on the first signal.

6. The method of claim 4, further comprising determining a first number of macroblocks by which to shift macroblocks of the first frame based at least in part on the first amount of movement of the camera.

7. The method of claim 6, further comprising:
determining a first macroblock of the first frame of image data; and
generating a second macroblock in the encoded representation of the second frame of image data, the second macroblock comprising a value of the first macroblock of the first frame shifted by the first number of macroblocks from a first position in the first frame to a second position in the encoded representation of the second frame.

8. The method of claim 4, further comprising:
generating a third frame of image data;
generating metadata for the third frame indicating that the third frame is a reference frame for the background image data; and
sending the third frame and the metadata to the second device, wherein the metadata is effective to cause the second device to store the third frame of image data in non-transitory computer-readable memory.

9. The method of claim 8, further comprising:
generating, by the camera of the first device, a third frame of image data representing a third view of the physical environment;
generating segmentation data for the third frame of image data, the segmentation data designating a first portion of the third frame of image data as foreground image data and a second portion of the third frame of image data as the background image data;
generating a fourth frame of image data comprising the foreground image data; and
sending the fourth frame of image data to the second device.

10. The method of claim 4, further comprising:
generating a third frame of image data;
generating segmentation data for the third frame of image data, the segmentation data designating a first portion of the third frame of image data as foreground image data and a second portion of the third frame of image data as the background image data;
generating a fourth frame of image data comprising the foreground image data;
generating metadata for the fourth frame indicating that the fourth frame is foreground image data; and
sending the fourth frame and the metadata to the second device, wherein the metadata is effective to cause the second device to combine the fourth frame of image data with the background frame of image data stored in non-transitory computer-readable memory.

11. The method of claim 4, further comprising:
generating a third frame of image data, wherein first metadata of the third frame of image data indicates that the third frame is a first reference frame for the background image data;
sending the third frame to the second device;
controlling the first device to move the camera by a second amount in at least one of the first direction or a second direction;
generating a fourth frame of image data based at least in part on the movement of the camera, wherein second metadata of the fourth frame of image data indicates that the fourth frame is a second reference frame for the background image data; and
sending the fourth frame to the second device.

12. A first device, comprising:
a camera;
at least one processor; and
non-transitory computer-readable memory storing instructions that, when executed by the at least one processor, are effective to cause the at least one processor to:
generate a first frame of image data representing a first view of a physical environment;
cause the first device to move the camera by a first amount in a first direction;
generate a second frame of image data representing a second view of the physical environment;
determine intra-frame motion by subtracting a first vector representing movement of the camera by the first amount in the first direction from a second vector representing motion between the first frame and the second frame;
determine motion vector data representing motion between the first frame and the second frame based at least in part on the intra-frame motion;
generate an encoded representation of the second frame of image data comprising the motion vector data;
send the encoded representation of the second frame of image data to a second device;
determine a first number of times that the camera moves over a first period of time;
send background image data to the second device at a first frequency;
determine a second number of times that the camera moves over a second period of time;
determine that the second number of times is greater than the first number of times; and
send background image data to the second device at a second frequency that is greater than the first frequency.

13. The first device of claim 12, the non-transitory computer-readable memory storing further instructions that, when executed by the at least one processor, are further effective to cause the at least one processor to:
send a first signal indicating the first amount and the first direction to a video encoder component; and
determine, by the video encoder component, the first vector based at least in part on the first signal.

14. The first device of claim 12, the non-transitory computer-readable memory storing further instructions that, when executed by the at least one processor, are further effective to cause the at least one processor to determine a first number of macroblocks by which to shift macroblocks of the first frame based at least in part on the first amount of movement of the camera.

15. The first device of claim 14, the non-transitory computer-readable memory storing further instructions that, when executed by the at least one processor, are further effective to cause the at least one processor to:
determine a first macroblock of the first frame of image data; and
generate a second macroblock in the encoded representation of the second frame of image data, the second macroblock comprising a value of the first macroblock of the first frame shifted by the first number of macroblocks from a first position in the first frame to a second position in the encoded representation of the second frame.

16. The first device of claim 12, the non-transitory computer-readable memory storing further instructions that, when executed by the at least one processor, are further effective to cause the at least one processor to:
   generate a third frame of image data;
   generate metadata for the third frame indicating that the third frame is a reference frame for the background image data; and
   send the third frame and the metadata to the second device, wherein the metadata is effective to cause the second device to store the third frame of image data in non-transitory computer-readable memory.

17. The first device of claim 16, the non-transitory computer-readable memory storing further instructions that, when executed by the at least one processor, are further effective to cause the at least one processor to:
   generate a third frame of image data representing a third view of the physical environment;
   generate segmentation data for the third frame of image data, the segmentation data designating a first portion of the third frame of image data as foreground image data and a second portion of the third frame of image data as the background image data;
   generate a fourth frame of image data comprising the foreground image data; and
   send the fourth frame of image data to the second device.

18. The first device of claim 12, the non-transitory computer-readable memory storing further instructions that, when executed by the at least one processor, are further effective to cause the at least one processor to:
   generate a third frame of image data;
   generate segmentation data for the third frame of image data, the segmentation data designating a first portion of the third frame of image data as foreground image data and a second portion of the third frame of image data as the background image data;
   generate a fourth frame of image data comprising the foreground image data;
   generate metadata for the fourth frame indicating that the fourth frame is foreground image data; and
   send the fourth frame and the metadata to the second device, wherein the metadata is effective to cause the second device to combine the fourth frame of image data with the background frame of image data stored in non-transitory computer-readable memory.

* * * * *